(12) United States Patent
Duginske

(10) Patent No.: US 11,020,808 B2
(45) Date of Patent: Jun. 1, 2021

(54) WOODWORKING MACHINERY JIG AND FIXTURE SYSTEM

(71) Applicant: Mark A. Duginske, Merrill, WI (US)

(72) Inventor: Mark A. Duginske, Merrill, WI (US)

( * ) Notice: Subject to any disclaimer, the term of this patent is extended or adjusted under 35 U.S.C. 154(b) by 0 days.

(21) Appl. No.: 16/852,106

(22) Filed: Apr. 17, 2020

(65) Prior Publication Data

US 2020/0298324 A1 Sep. 24, 2020

Related U.S. Application Data

(62) Division of application No. 15/863,725, filed on Jan. 5, 2018, now Pat. No. 10,646,933.

(60) Provisional application No. 62/442,761, filed on Jan. 5, 2017.

(51) Int. Cl.
*B23B 49/00* (2006.01)
*G01B 5/00* (2006.01)
*B23B 47/28* (2006.01)

(52) U.S. Cl.
CPC .............. *B23B 49/00* (2013.01); *B23B 47/28* (2013.01); *B23B 47/287* (2013.01); *G01B 5/0009* (2013.01); *B23B 2247/10* (2013.01); *B23B 2260/088* (2013.01); *B23B 2260/104* (2013.01)

(58) Field of Classification Search
CPC ....... B23B 49/00; B23B 49/003; B23B 47/28; B23B 47/287; B27B 27/08; B27B 27/00
USPC ............... 33/630, 638, 640; 83/468.6, 468.2, 83/468.1, 468.7, 468.3
See application file for complete search history.

(56) References Cited

U.S. PATENT DOCUMENTS

| | | | |
|---|---|---|---|
| 2,838,966 A | 6/1958 | Campbell | |
| 2,966,080 A | 12/1960 | Atols | |
| 3,964,360 A | 6/1976 | Schwartz | |
| 4,145,160 A * | 3/1979 | Wiggins | B23B 47/288 408/103 |
| 4,449,867 A | 5/1984 | Dergo | |
| 4,476,757 A | 10/1984 | Morris | |
| 4,920,846 A | 5/1990 | Duginske et al. | |
| 4,955,766 A | 9/1990 | Sommerfeld | |
| 5,018,912 A | 5/1991 | Reitz | |
| 5,038,486 A | 8/1991 | Ducate, Sr. | |
| 5,107,601 A | 4/1992 | Semchuck | |
| 5,337,641 A * | 8/1994 | Duginske | B27B 25/10 144/253.1 |
| 5,490,665 A * | 2/1996 | Thiele | B23D 59/001 269/303 |
| 5,493,789 A | 2/1996 | Duginske | |
| 5,617,909 A | 4/1997 | Duginske | |
| 5,666,737 A | 9/1997 | Ryan, III | |
| 5,676,000 A | 10/1997 | Chen | |
| 5,735,054 A | 4/1998 | Cole | |
| 5,768,966 A | 6/1998 | Duginske | |

(Continued)

OTHER PUBLICATIONS

ABZ Woodshop, Shaker Bench Project, Copyright 2014 Mark Duginske & Jon Drew, 15 pages.

(Continued)

*Primary Examiner* — Christopher W Fulton
(74) *Attorney, Agent, or Firm* — Quarles & Brady LLP

(57) ABSTRACT

Jigs and fixtures for aligning, guiding, and/or holding a workpiece on woodworking machinery during a woodworking operation are described, as well as methods of making, modifying, and using jigs and fixtures.

20 Claims, 19 Drawing Sheets

(56) References Cited

U.S. PATENT DOCUMENTS

| | | | |
|---|---|---|---|
| 5,787,781 A * | 8/1998 | Hile | B26D 1/0006 |
| | | | 83/467.1 |
| 5,813,803 A | 9/1998 | Sommerfeld | |
| 6,237,457 B1 | 5/2001 | Taylor | |
| 6,240,822 B1 * | 6/2001 | Musser | B23D 47/025 |
| | | | 144/145.1 |
| 6,481,936 B1 | 11/2002 | Hecht | |
| 6,499,224 B1 | 12/2002 | Asick | |
| D471,925 S | 3/2003 | Duginske | |
| 6,557,601 B1 | 5/2003 | Taylor | |
| 6,599,064 B1 | 7/2003 | Robinson | |
| 6,622,997 B2 | 9/2003 | Emerson | |
| 6,880,442 B2 * | 4/2005 | Duginske | B27B 27/08 |
| | | | 144/253.1 |
| 7,464,737 B2 | 12/2008 | Duginske | |
| 7,641,425 B2 | 1/2010 | Sommerfeld et al. | |
| 7,726,411 B2 | 6/2010 | McSheffrey, Jr. et al. | |
| 7,798,187 B1 | 9/2010 | Duginske | |
| 7,930,960 B2 | 4/2011 | Duginske | |
| 8,083,443 B1 | 12/2011 | Circosta et al. | |
| 8,231,313 B2 | 7/2012 | Sommerfeld et al. | |
| 8,840,345 B1 | 9/2014 | Park | |
| 9,969,042 B2 | 5/2018 | Clark | |
| 10,144,068 B1 | 12/2018 | Poole et al. | |
| 2001/0047706 A1 | 12/2001 | Parks et al. | |
| 2002/0150434 A1 | 10/2002 | Sommerfeld et al. | |
| 2003/0056631 A1 | 3/2003 | Duginske | |
| 2004/0065387 A1 * | 4/2004 | Smith | B27C 5/04 |
| | | | 144/253.1 |
| 2005/0056345 A1 | 3/2005 | Duginske | |
| 2005/0115376 A1 * | 6/2005 | Jimenez | B23D 47/04 |
| | | | 83/464 |
| 2005/0279200 A1 | 12/2005 | Duginske | |
| 2006/0191122 A1 | 8/2006 | Collins | |
| 2006/0228180 A1 | 10/2006 | Sommerfeld et al. | |
| 2006/0233620 A1 | 10/2006 | Herrick | |
| 2006/0248998 A1 | 11/2006 | Duginske | |
| 2007/0280795 A1 | 12/2007 | McDaniel et al. | |
| 2009/0053003 A1 | 2/2009 | Clark | |
| 2011/0192497 A1 * | 8/2011 | Clark | B27M 3/08 |
| | | | 144/371 |
| 2014/0197589 A1 * | 7/2014 | Ducek | B25H 1/02 |
| | | | 269/309 |
| 2014/0341665 A1 * | 11/2014 | Clark | B23B 47/287 |
| | | | 408/67 |
| 2015/0298217 A1 | 10/2015 | Clark et al. | |
| 2017/0087644 A1 | 3/2017 | Pelkey | |
| 2017/0100782 A1 | 4/2017 | Pedersen | |
| 2018/0185930 A1 * | 7/2018 | Duginske | B23B 47/287 |

OTHER PUBLICATIONS

Duginske, Basic Cabinetmaking, Copyright 2005 Mark Duginske, 40 pages.
Kreg, Kreg Jig Support Stop Assembly and Instructions, Version 2005701, 2 pages.
Kreg, Quick-Start Guide, Rev C, Jun. 2010, 27 pages.
Kreg, Precision Trak & Stop Kit, KMS8000, Instructional Manual, May 2010, 3 pages.
Kreg, Kreg Jig K4 / Kreg Jig K4 Master System, Owner's Manual, Version 1, Apr. 2015, 32 pages.
Kreg, Kreg Jig K5 / Kreg Jig K5 Master System, Owner's Manual, Version 2, Nov. 2016, 40 pages.
Kreg, Solutions, vol. 32, 2016, 31 pages.
Woodpeckers, 1" Flip Stop, 1 page.
Kreg, Kreg Jig Material Support Stop Assembly and Instructions, NK9292, Version 1, Jan. 2018, 2 pages.
Kreg, Solutions, vol. 33, 2017, 64 pages.

* cited by examiner

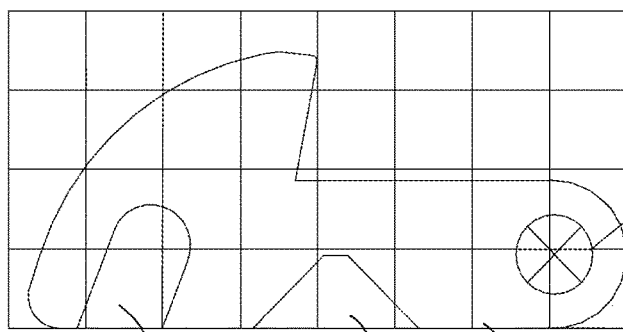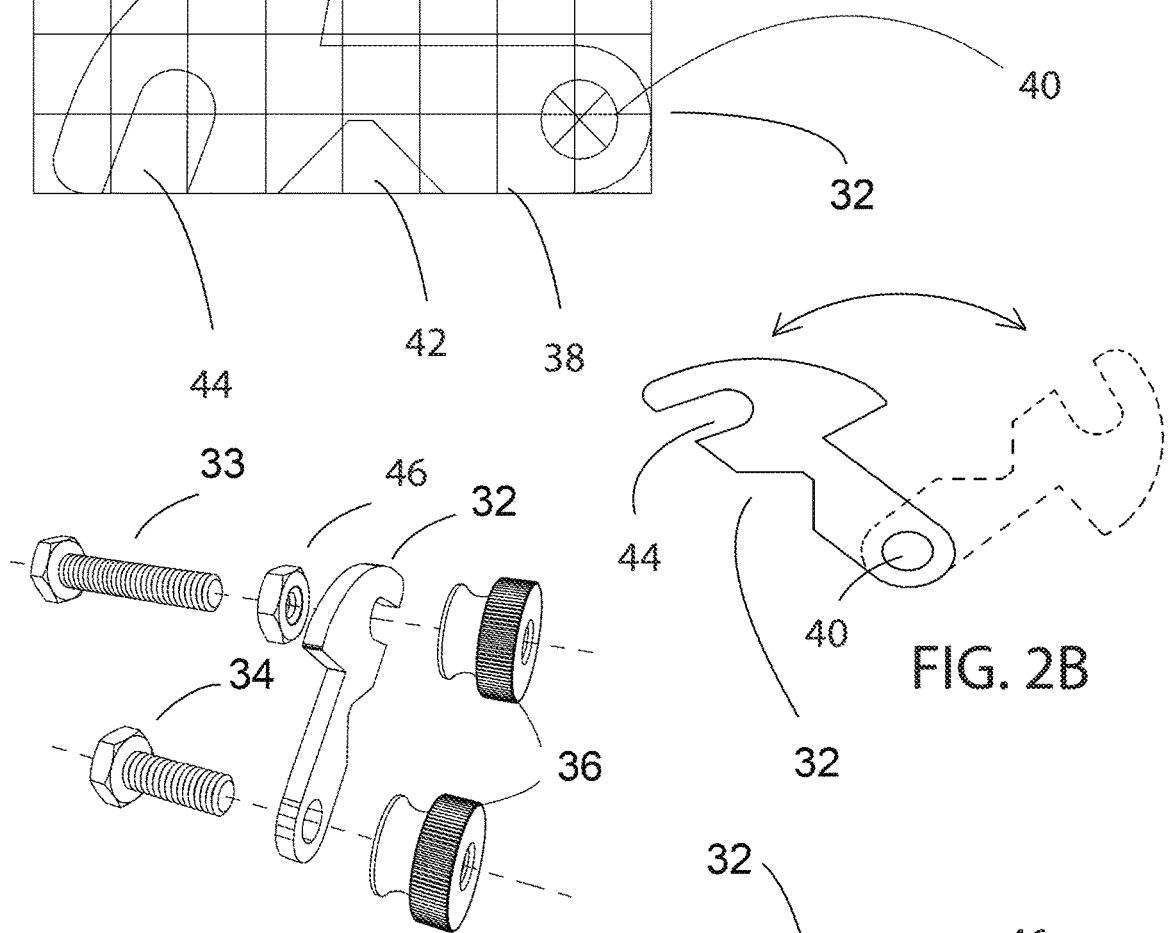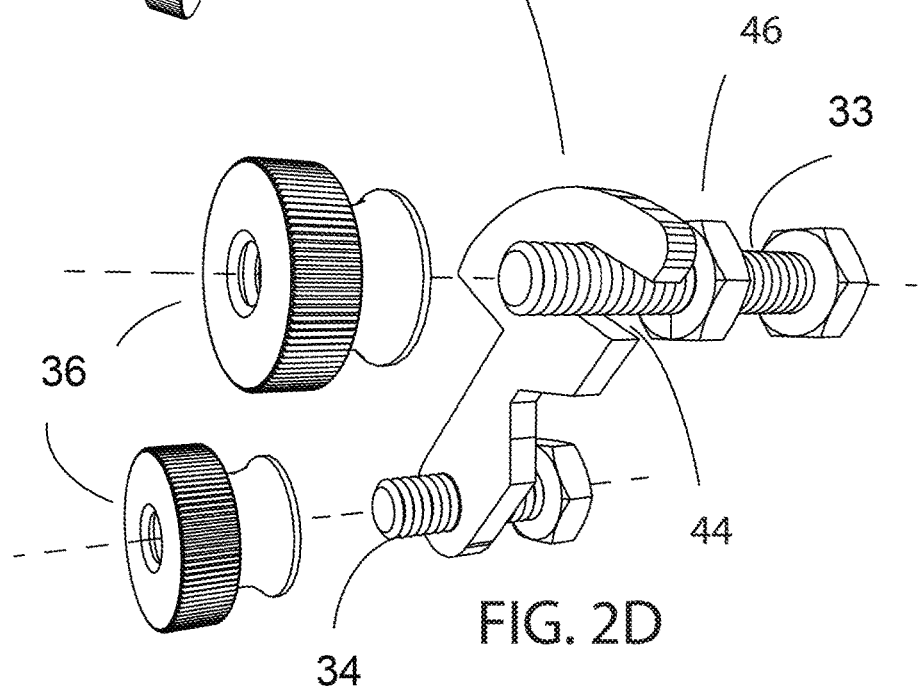

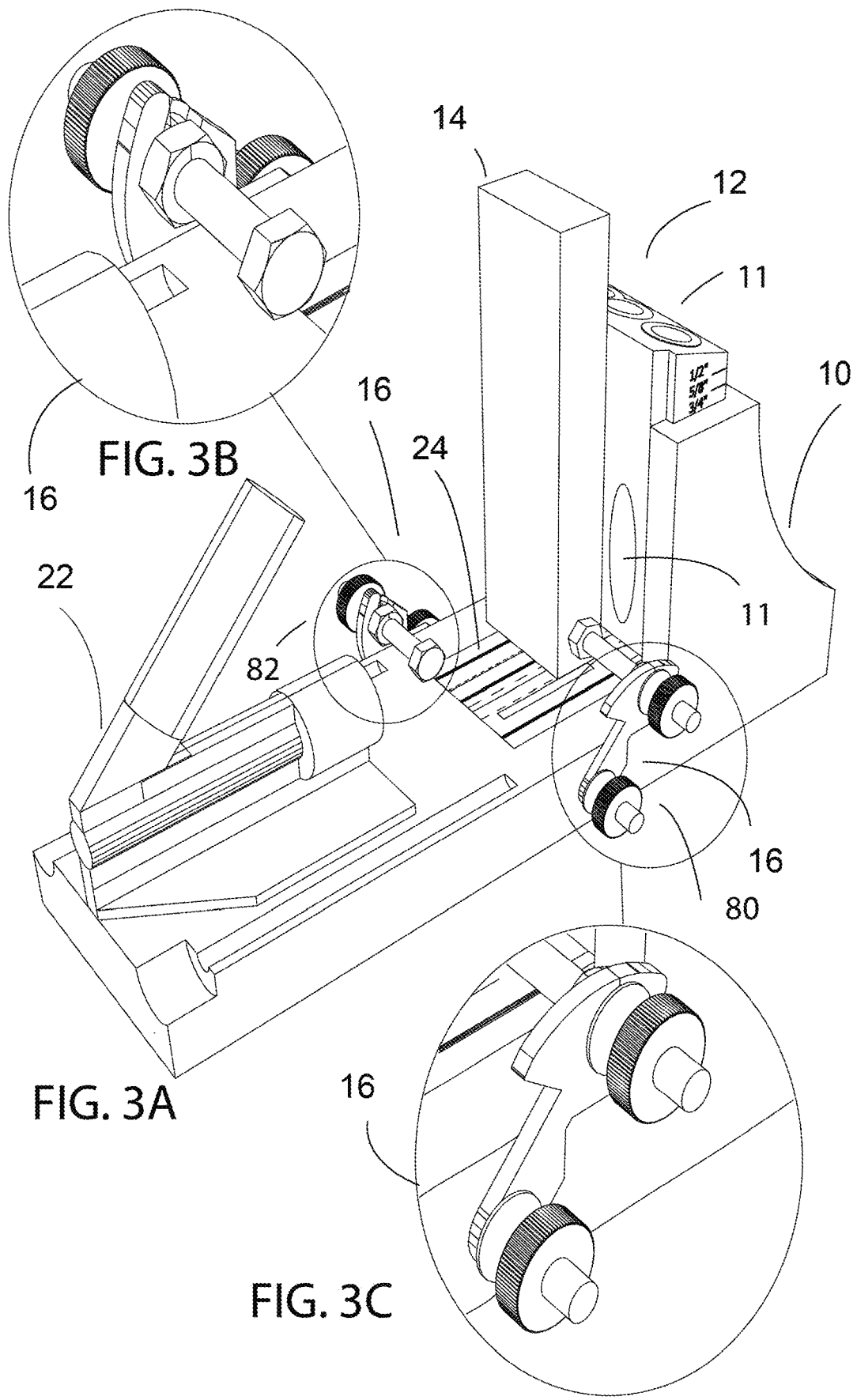

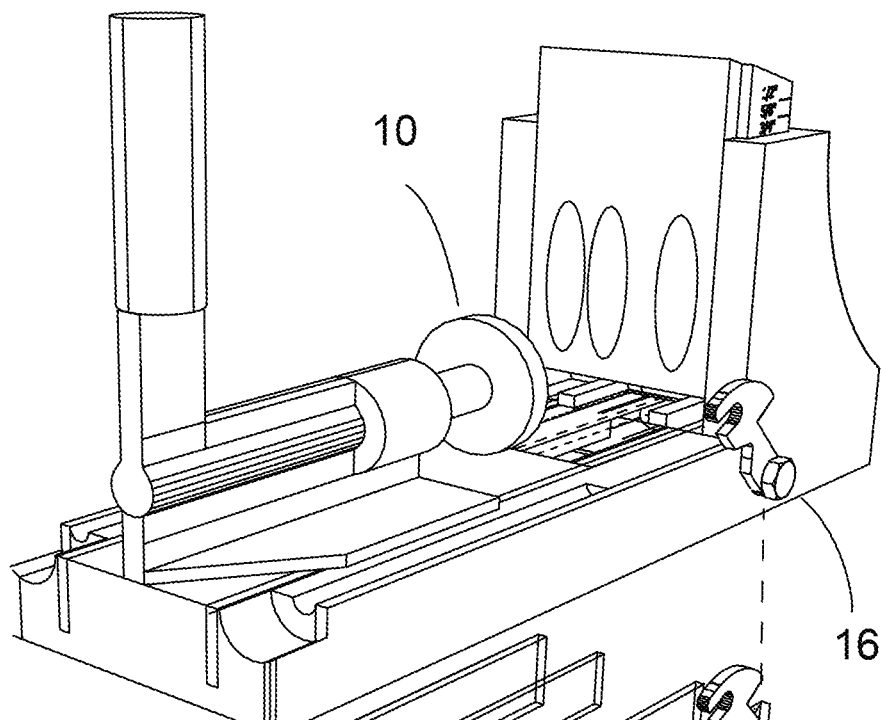
FIG. 5 A
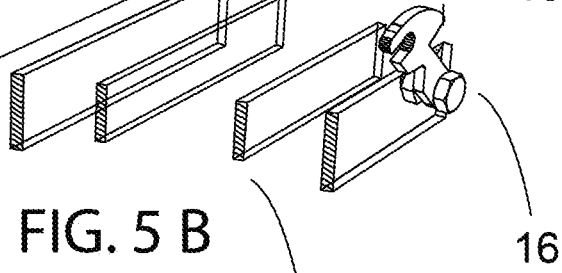
FIG. 5 B
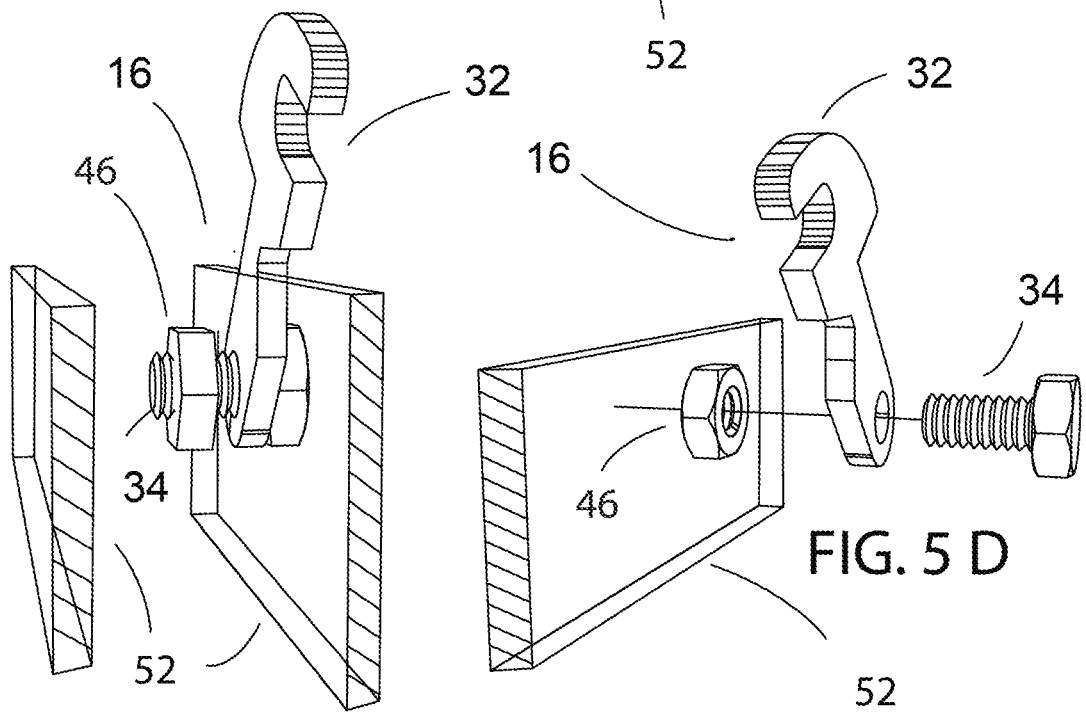
FIG. 5 C
FIG. 5 D

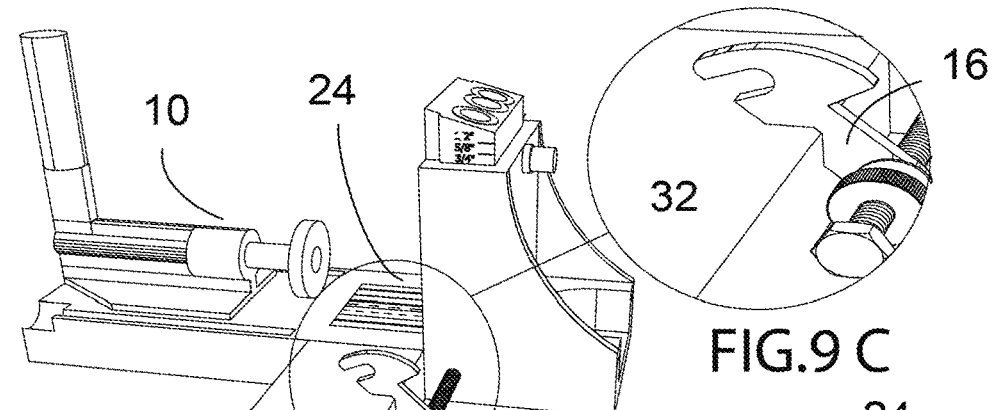
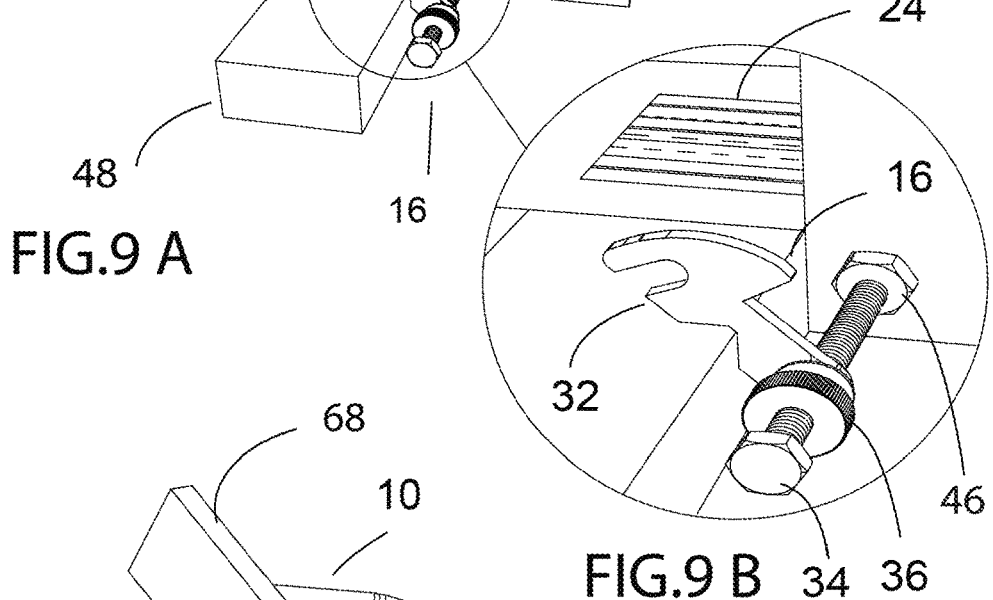
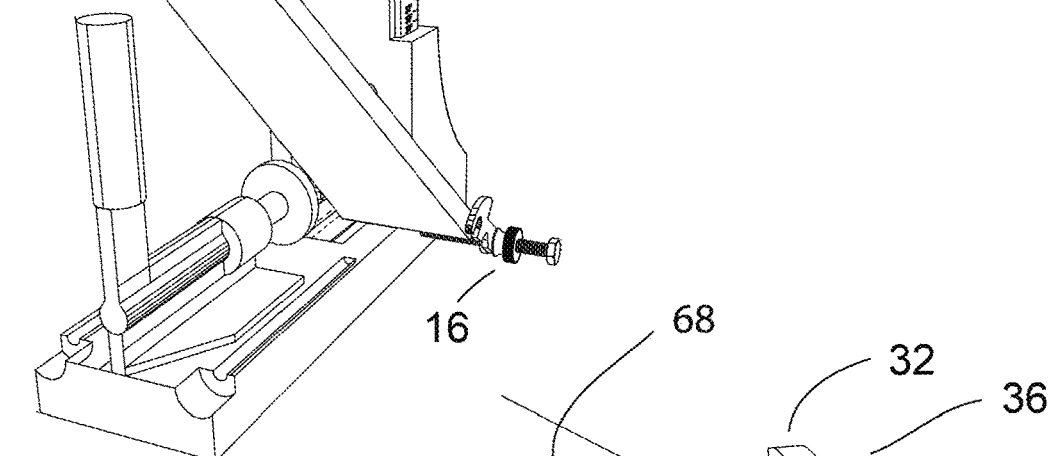

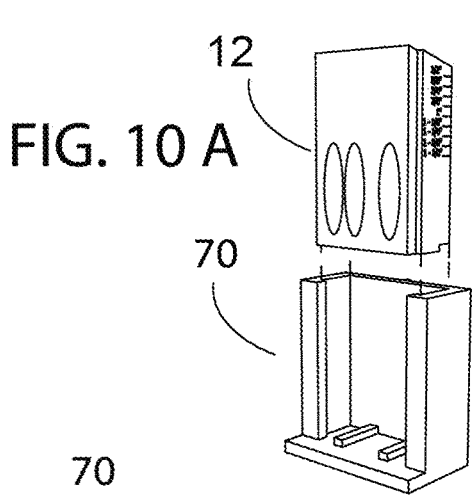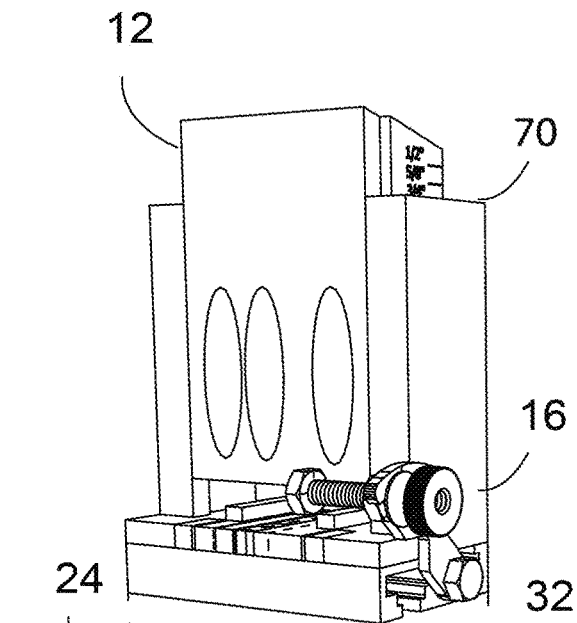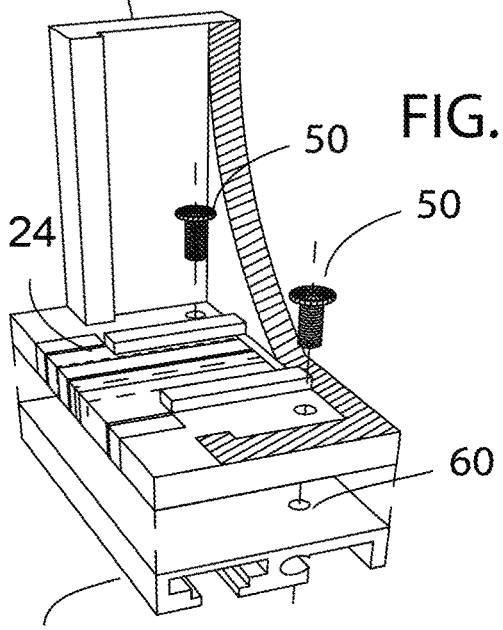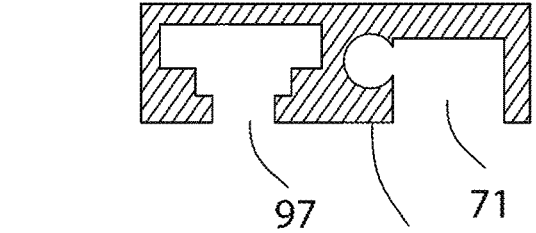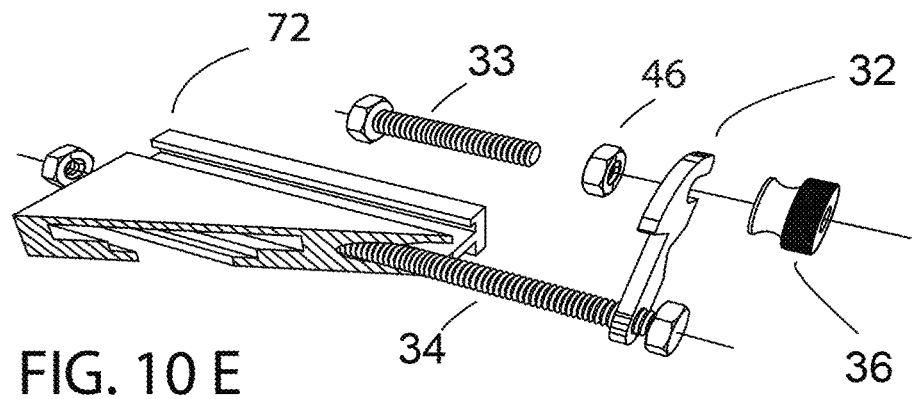

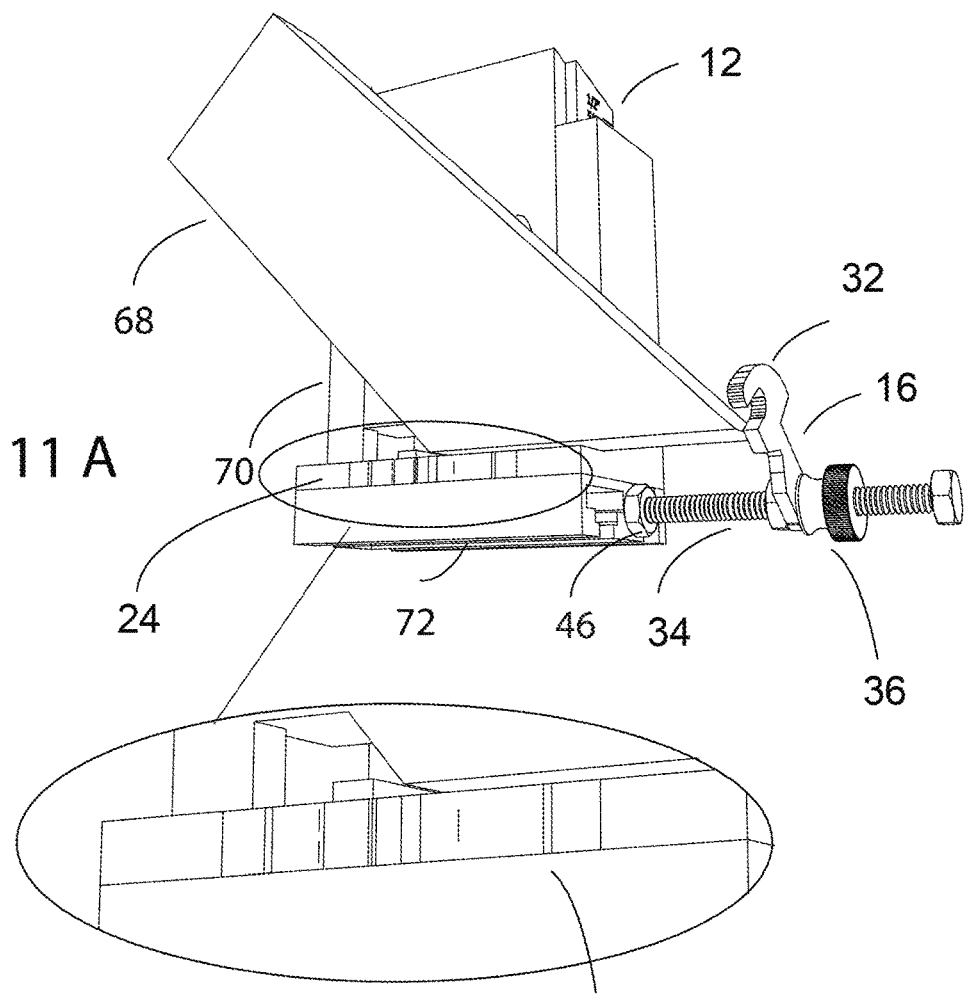
FIG. 11 A
FIG. 11 B
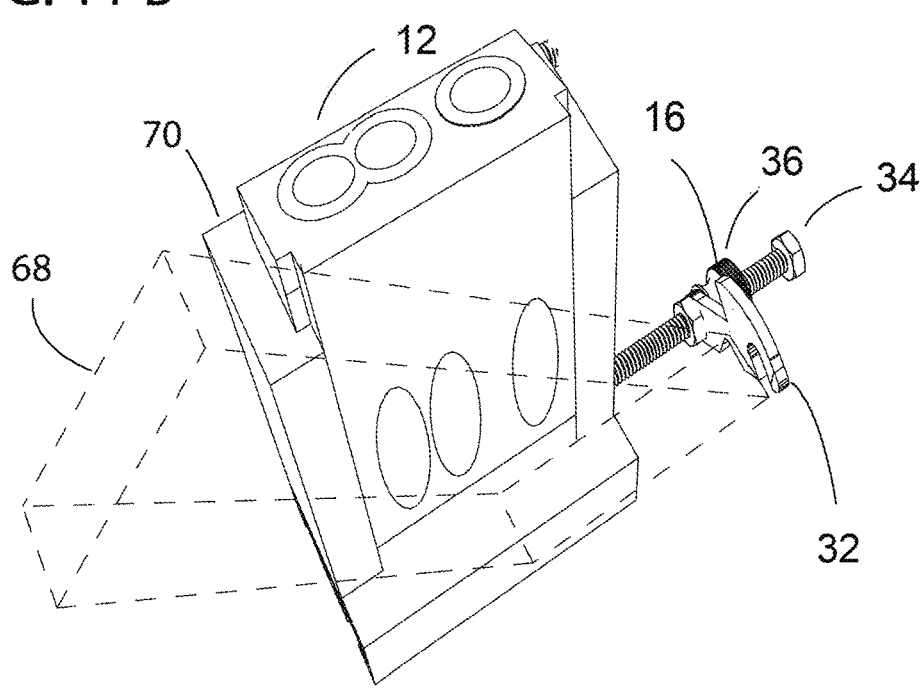
FIG. 11 C

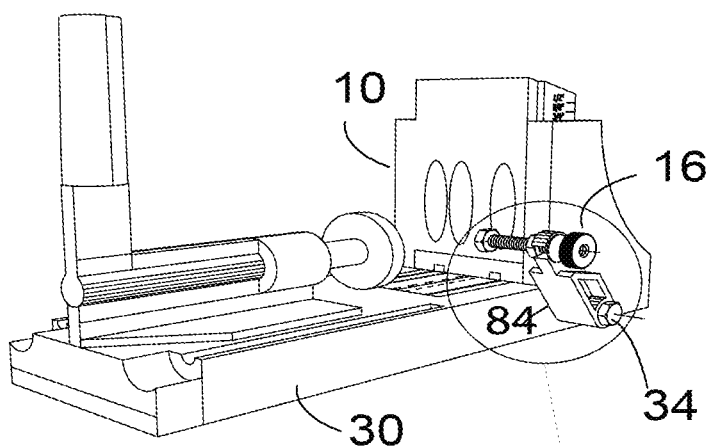
FIG. 12 A
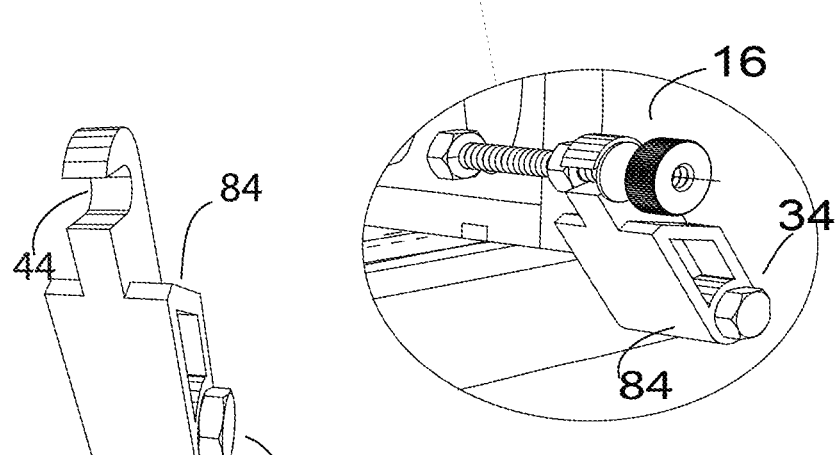
FIG. 12 B
FIG. 12 C
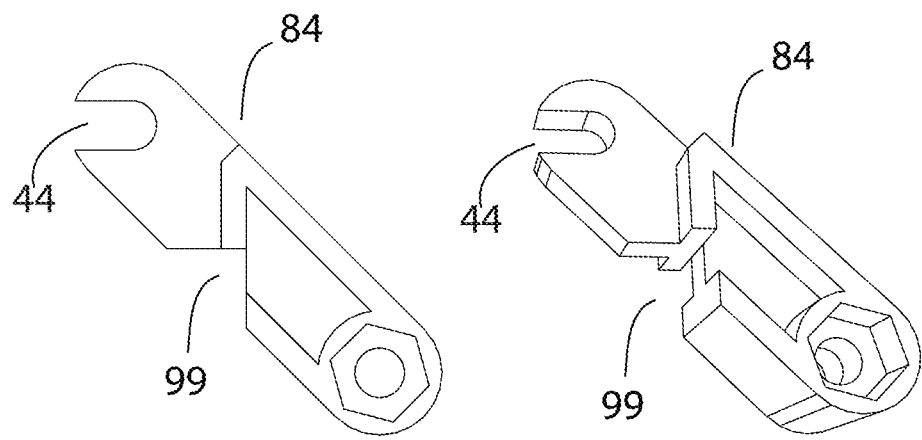
FIG. 12 D
FIG. 12 E

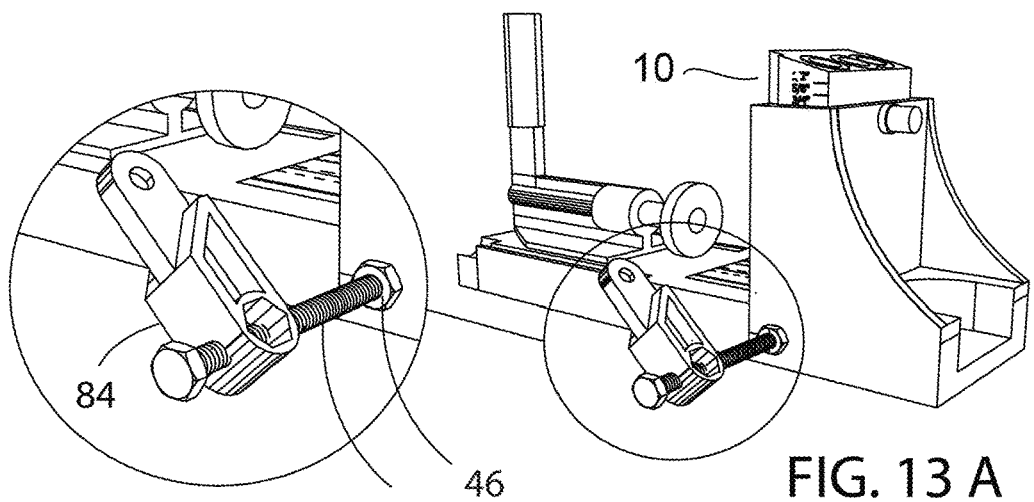
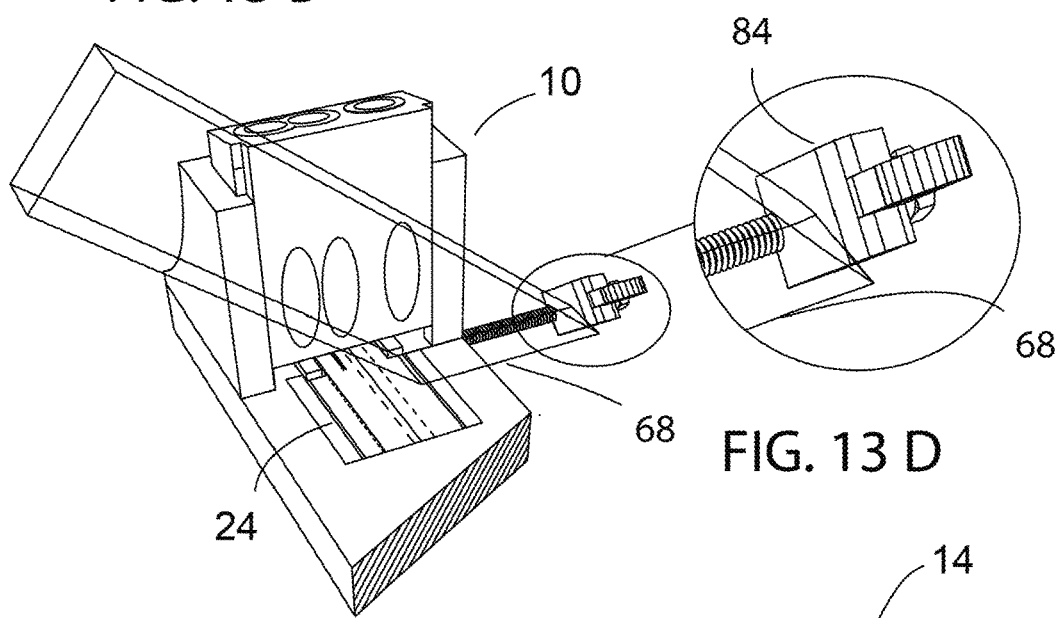
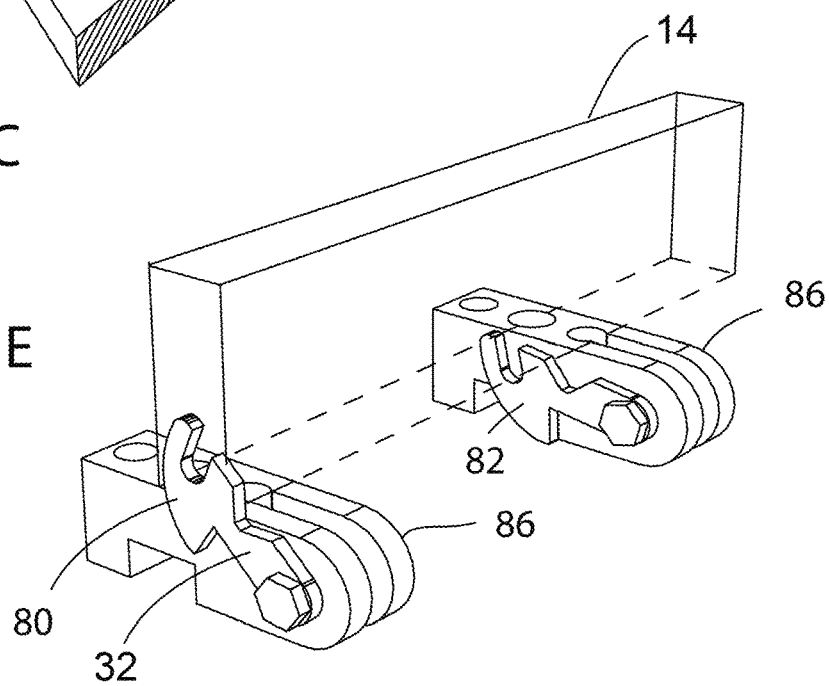

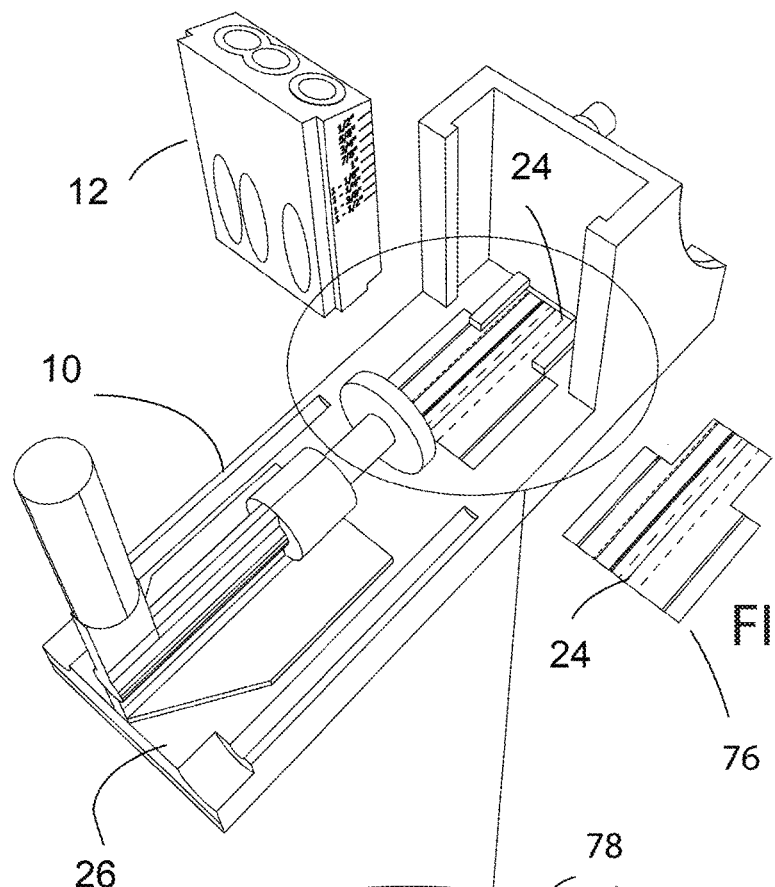
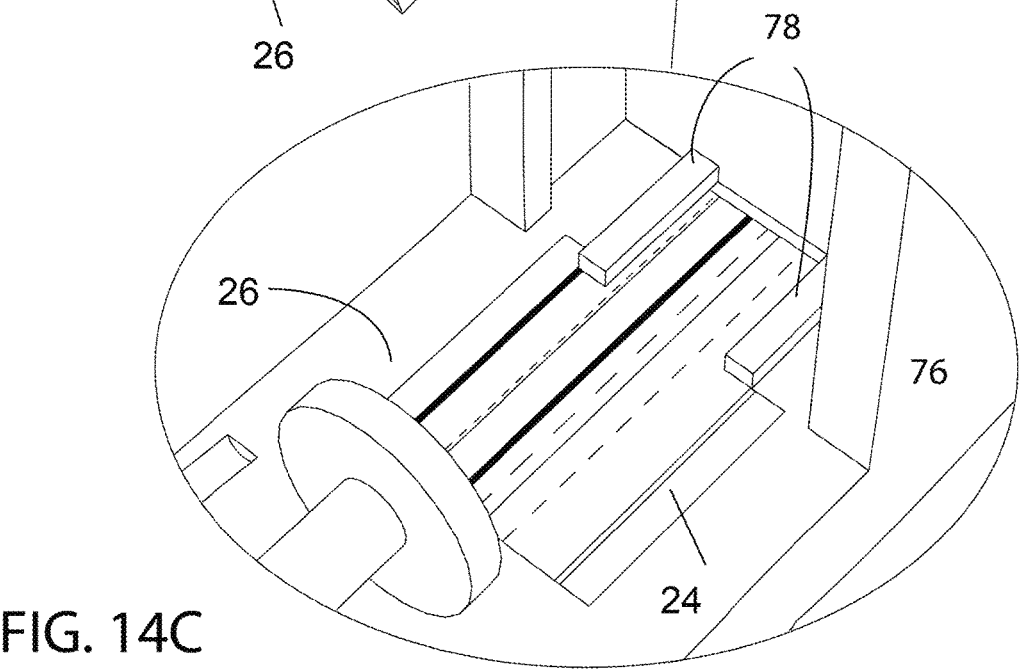

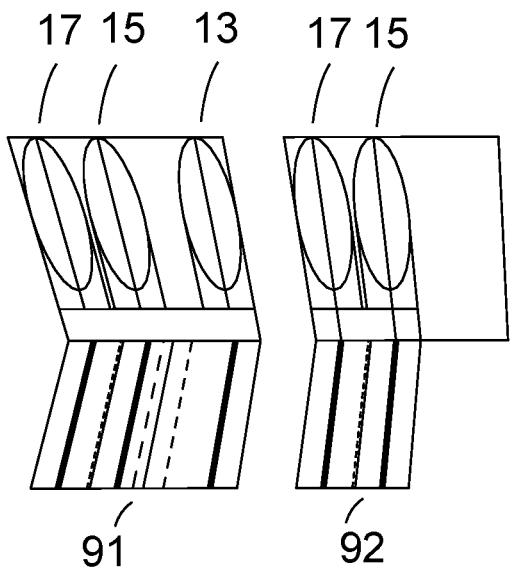
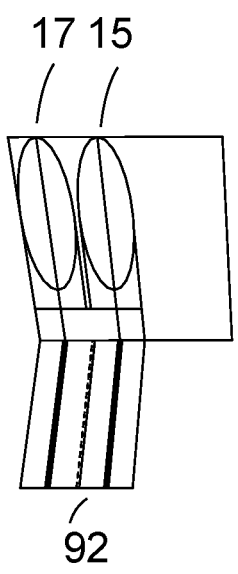
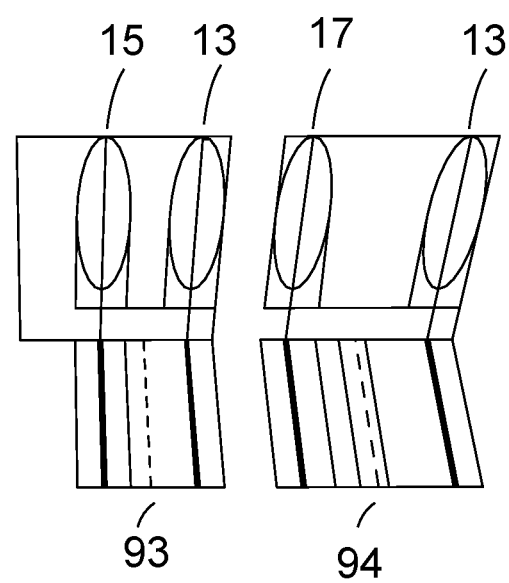
FIG. 17A  FIG. 17B  FIG. 17C  FIG. 17D
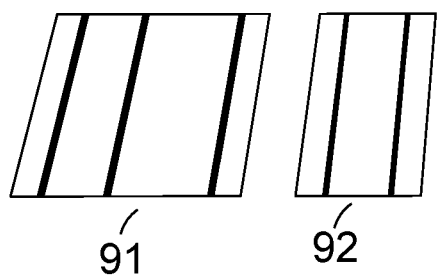
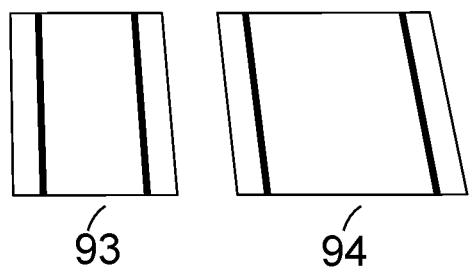
FIG. 17E  FIG. 17F  FIG. 17G  FIG. 17H
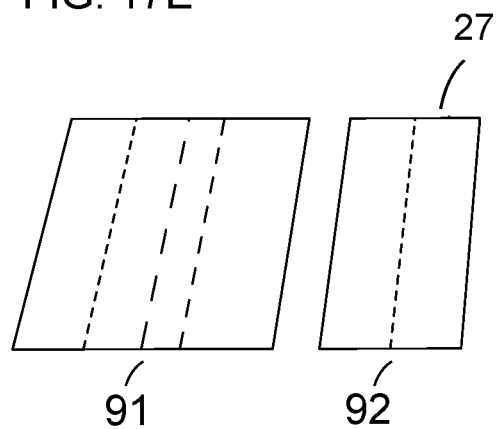
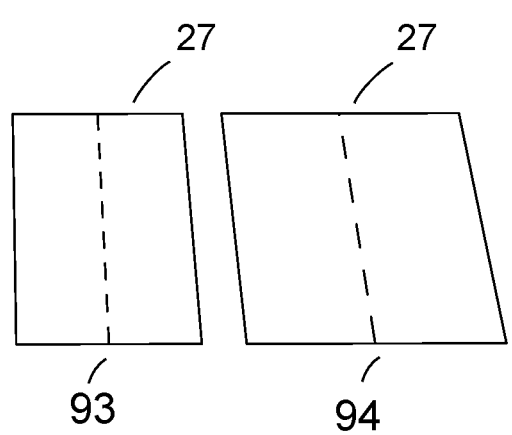
FIG. 17I  FIG. 17J  FIG. 17K  FIG. 17L

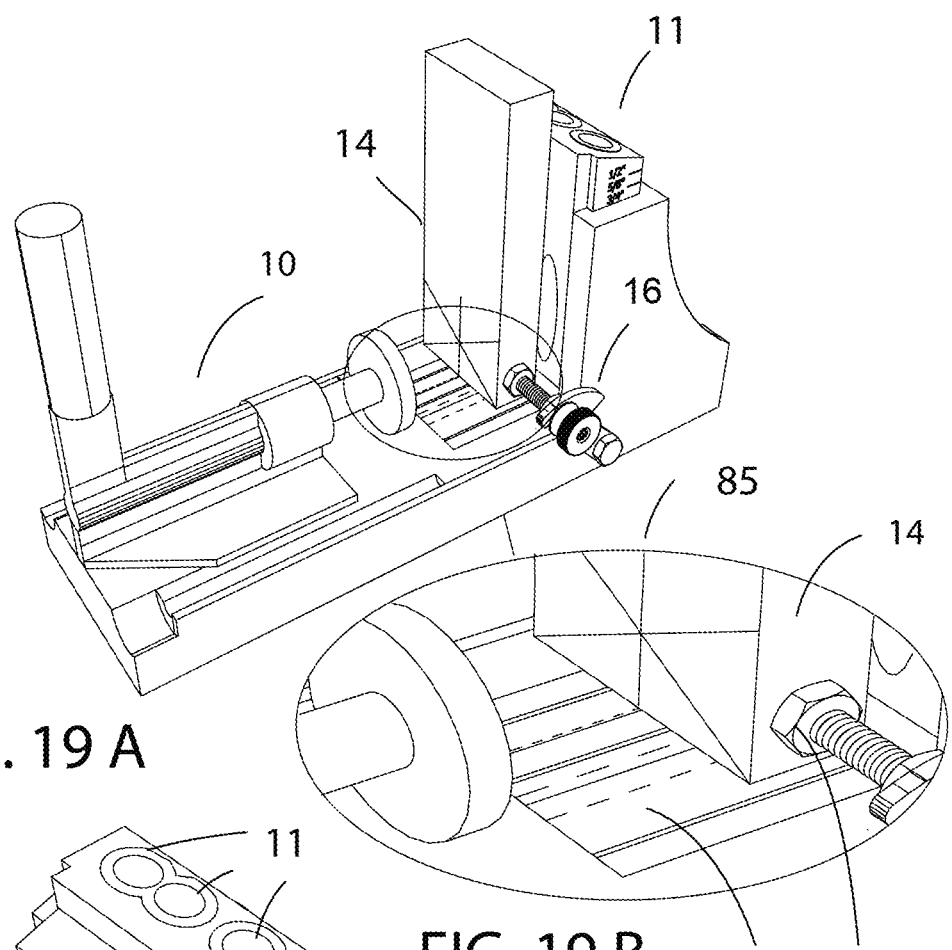
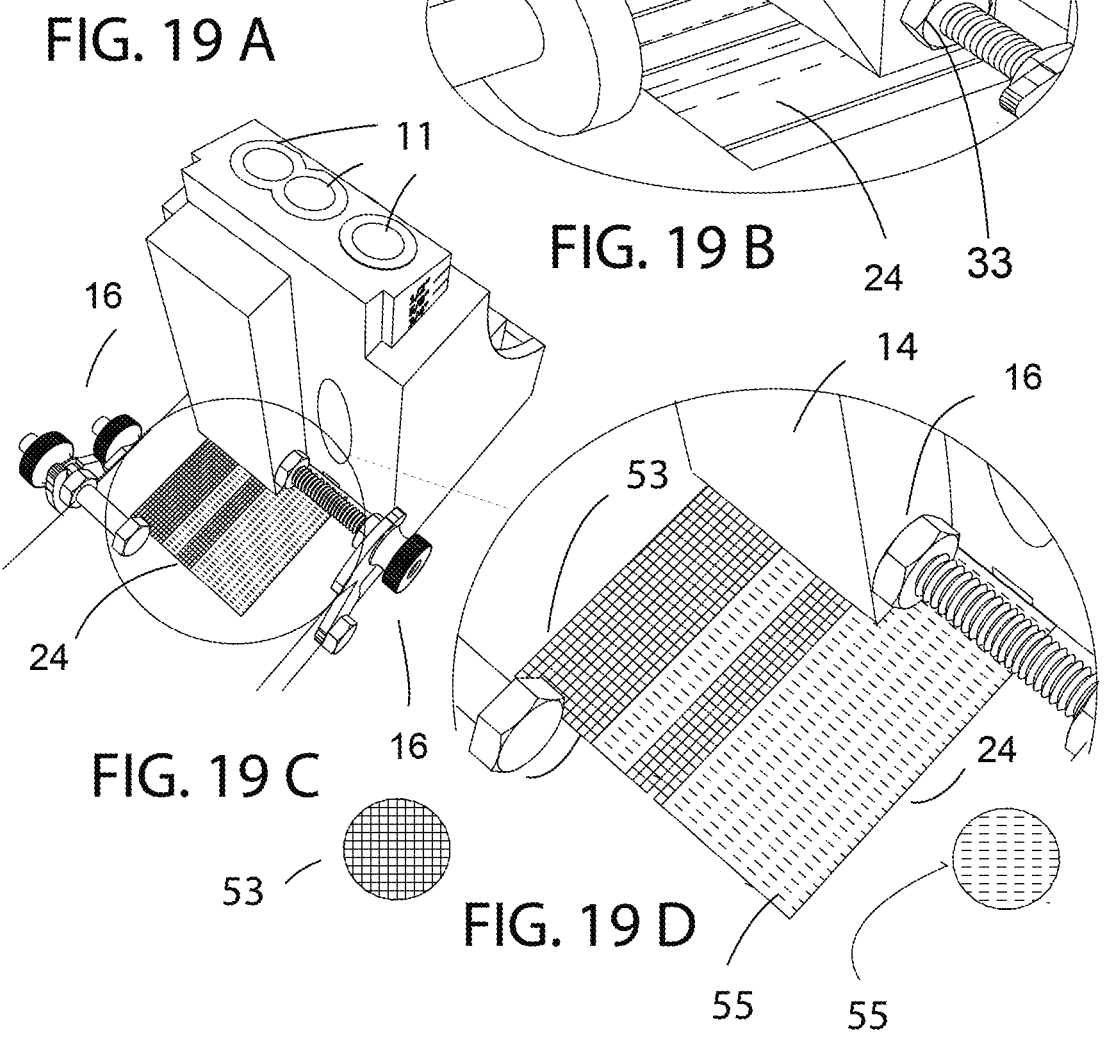
FIG. 19 A
FIG. 19 B
FIG. 19 C
FIG. 19 D

WOODWORKING MACHINERY JIG AND FIXTURE SYSTEM

CROSS-REFERENCE TO RELATED APPLICATIONS

This application is a divisional of U.S. patent application Ser. No. 15/863,725 filed Jan. 5, 2018, now U.S. Pat. No. 10,646,933 issued May 12, 2020, which claims priority from U.S. Provisional Application No. 62/442,761 filed Jan. 5, 2017, the entire contents of which are hereby incorporated by reference as if all fully set forth herein.

STATEMENT CONCERNING FEDERALLY SPONSORED RESEARCH OR DEVELOPMENT

Not applicable.

FIELD OF THE INVENTION

This invention relates to jigs and fixtures for aligning, guiding, and/or holding a workpiece on woodworking machinery during a woodworking operation.

BACKGROUND OF THE INVENTION

Woodworking machines utilize various means of positioning or securing a workpiece as it is cut, drilled or routed. As standard equipment a pocket hole jig is usually secured to a movable plywood base. The usual approach is to add a piece of plywood (or other wood board) to the bottom of the jig, called an auxiliary table top, to provide a more stable surface to secure and control the workpiece. By adding a board that is the same thickness as the pocket hole jig to the auxiliary table top the workpiece is supported closely adjacent to the drill guide and there is less chance of the workpiece moving or sliding during the drilling operation. By adding an extra board to the side of the pocket hole jig, a stop system such as the one featured in U.S. Pat. No. 5,337,641 can be added to the pocket hole jig set up. The benefit of this technique is that the operator knows that the end of the board being drilled is accurately positioned. The accuracy of processing multiple pieces is improved with a stop system. There is no mechanism for adding the extrusions of the U.S. Pat. No. 5,337,641 to the portable base.

Workpieces with identical holes can then be drilled consistently improving the workmanship of a project. KREG Tool offers an optional material support stop that has a base that is the same height as the K3 and K4 jig bottoms so a long workpiece or panel is supported with the bottom of the workpiece parallel to the floor of the jig. This technique of using the material support base eliminates the tedious task of lining up and holding the workpiece in place. In addition, a flippable arm can be fitted to the base with an adjustable bolt for fine tuning the position of the board in relationship to the flip stop. Although the KREG support stop can be used to support the bottom of the workpiece and position the board with the flip stop feature there is a problem with doing both the support and measuring feature at the same time because the base and the flip arm are the same width. The wide part of the flip arm occupies the same space as the workpiece when it is flipped into position.

As standard equipment, the KREG jig has three lines on the floor of the base that are aligned with the center of the pocket hole drill guide. Theoretically, the line could be used to line up a stop for making constant multiple pieces but they are small and are often covered by the workpiece. The outside of the hole would be a better reference for positioning the workpiece in relationship to the hole (s) or hole combinations. The KREG flip stops that are currently available are not amenable to use for miter workpieces. Known techniques for aligning the workpiece for the stationary jig and the portable base have typically been different from each other especially since there is no stop system currently manufactured or sold that fits the KREG portable base.

SUMMARY OF THE INVENTION

This invention provides an improved system for making improvements to and using a pocket hole jig system, such as the KREG pocket hole jig. A woodworking jig and fixture system of the invention decal/indicia is positioned on the floor of the stationary jig and the portable jig base.

The invention provides an improved pocket hole jig measuring system with a flip stop for each jig and the portable base to easily measure the distance between the end of the board and the pocket hole(s). In addition, customized hardware for attaching the flip stop to the jig is provided and described. Instructions are provided for the jig owner or user to drill holes in the existing jig to mount the flip stops. The extrusion for the portable base can be screwed to the extrusion hardware using the existing holes thus certain existing portable base need no alteration to use the hardware.

In another aspect a color coded hole decal/indicia illustrates the position of the center of the hole, the outside of the pocket hole, and the center of pocket hole combinations. On the floor of the jig under the board is a color-coded hole scale showing the width of hole combinations. A blue line shows the center of the pocket guide holes. A flip stop on the side of jig has an adjustable threaded bolt which is adjusted to touch the end of the workpiece to position the piece for drilling the pocket holes.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 2A is a ¼ inch grid showing the shape of the L-shaped flip stop arm.

FIG. 2B shows how the flip arm rotates through an arc by the use of a hole in the longer leg.

FIG. 2C is an exploded view of the flip arm assembly.

FIG. 2D is an exploded view of the flip arm assembly showing the open notch near the outside corner of the long leg of the L-shape.

FIG. 3A shows the jig with a square board clamped in the jig. On the floor of the jig under the board is a color-coded hole decal/indicia. Two flip stop assemblies are shown located on the side of the jig floor. One stop is resting against the workpiece and the one on the opposite side of the jig is moved out of line with the position of the workpiece.

FIG. 3B is a close up of the stop assembly not in contact with the workpiece.

FIG. 3C is a close up of the stop assembly that is in contact with the workpiece.

FIG. 5A is a ground level perspective showing the jig with a flip stop attached on the side of the jig.

FIG. 5B illustrated the floor sides and the interior support ribs of the plastic pocket hole jig.

FIG. 5C shows the flip arm secured to the solid wall of the jig with a nut and a bolt positioned in a hole in the jig.

FIG. 5D is an exploded view of FIG. 5C.

FIG. 9A is a perspective of the flip arm secured on the long bolt attached to the side of the jig under the drill guide block.

FIG. 9B is a close up of the flip stop assembly illustrating the nut locking the bolt to the jig and showing the detail of the V-notch in the middle of the flip arm not contacting the support workpiece support board.

FIG. 9C a close-up view of the flip stop is in contact with the tip of a mitered board.

FIG. 9D illustrates the flip arm assembly positioned on a threaded rod away from the jig and the flip stop is in contact with the tip of a mitered board.

FIG. 9E is a detail of the miter point.

FIG. 10A shows the drill guide block sliding into the portable base.

FIG. 10B is an expanded view of the portable base, the decal/indicia and the flip arm.

FIG. 10C is a perspective cut away view of the portable base and the screws that fit through the holes inside the base and thread into the holes on the top of the custom made extrusion.

FIG. 10D is an end view of the portable extrusion showing a T-slot, hole and a U-channel.

FIG. 10E is a sectional view of the extrusion illustrated in FIG. 10D.

FIG. 11A is a perspective showing the angle of a miter joint resting on the portable jig floor with the tip of the miter contacting the flip stop arm secured to the jig with a long bolt.

FIG. 11B is a close-up view of the FIG. 11A illustrating the decal/indicia viewable from the front of the portable base floor.

FIG. 11C illustrates the tip of the miter in contact with the flip arm.

FIG. 12A illustrates a version of the flip assembly with the material support arm secure to the jig with a bolt.

FIG. 12B illustrates a groove in the flip arm to easily remove and reposition the adjustment bolt.

FIG. 12C is an enlarged view of FIG. 12A.

FIG. 12D illustrates a V-notch made in the middle of the flip arm.

FIG. 12E is a perspective view of the V-notch added to the flip arm.

FIG. 13A illustrates a modified material support arm, such as the KREG material support arm, that was drilled and taped at 90 degrees from the original through hole. It is threaded on to a bolt secured to the jig and secured with a nut.

FIG. 13B is a close-up view of FIG. 13A.

FIG. 13C illustrated the FIG. 13A with a mitered board contacting the flip stop.

FIG. 13D is a close up of FIG. 13C showing the miter point against the stop.

FIG. 13E illustrates a workpiece resting on the material support base with the thin metal flip arm of the invention elevated to engage the end of the board to record the desired position of the workpieces.

FIG. 14A is a perspective of the jig with the drill guide block removed to show the decal/indicia, which is a piece of screen-printed thin aluminum sheet stock die cut in a T-shape with the shape of two rectangles connected to each other.

FIG. 14B illustrates the shape of two rectangles connected to each other.

FIG. 14C is a close up view of the decal/indicia fitted between the two elevated ribs on the floor of the jig.

FIG. 17A is a smaller version of FIG. 16B sized so that it can be illustrated on a page with the other sectors of information shown next to each other.

FIG. 17B illustrates the smaller B and C hole combination.

FIG. 17C illustrates the medium size B and A hole combination.

FIG. 17D illustrates the widest C and A hole combination.

FIG. 17E is a smaller version of FIG. 16B sized so that it can be illustrated on a page with the other sectors of information shown next to each other.

FIG. 17F illustrates the smaller B and C hole combination.

FIG. 17G illustrates the medium size B and A hole combination.

FIG. 17H illustrates the widest C and A hole combination.

FIG. 17I is a smaller version of FIG. 16B sized so that it can be illustrated on a page with the other sectors of information shown next to each other.

FIG. 17J illustrates the smaller B and C hole combination center line.

FIG. 17K illustrates the median size B and A hole combination center line.

FIG. 17L illustrates the widest C and A hole combination center line.

FIG. 19A shows the workpiece 14 clamped in the pocket hole jig 10 with the center line of the workpiece 85 aligned the dotted center line 27 of hole combinations 92.

FIG. 19B is an enlargement of FIG. 19A.

FIG. 19C shows the workpiece 14 centered on the yellow area of the decal/indicia 53 for the hole combination of holes B and C 92.

FIG. 19 D is an enlargement of FIG. 19 B.

DETAILED DESCRIPTION OF THE PREFERRED EMBODIMENT

Figure 1A:
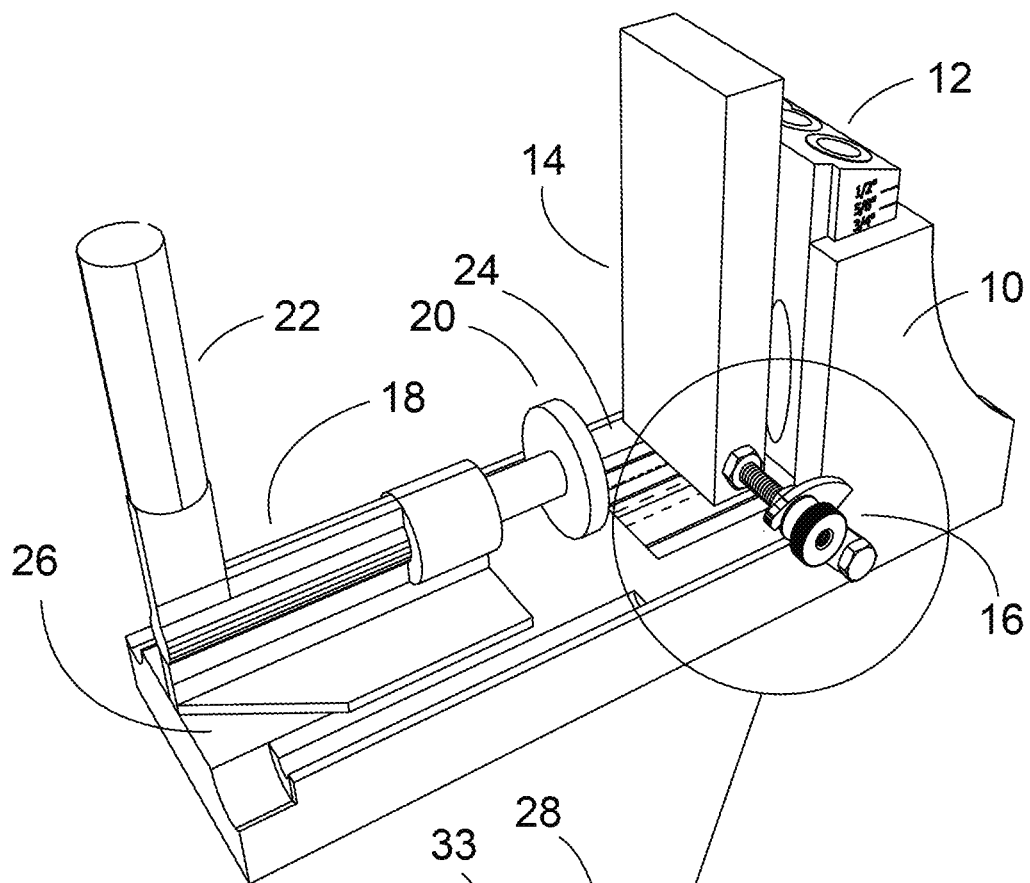
FIG. 1A is a perspective view of a modified pocket hole jig with flip stop assembly attached to the jig with a bolt, which is located under the drill guide block. A square workpiece board is clamped in the jig and is in contact with an adjustable positioning bolt in the flip stop assembly.
Figure 1B:
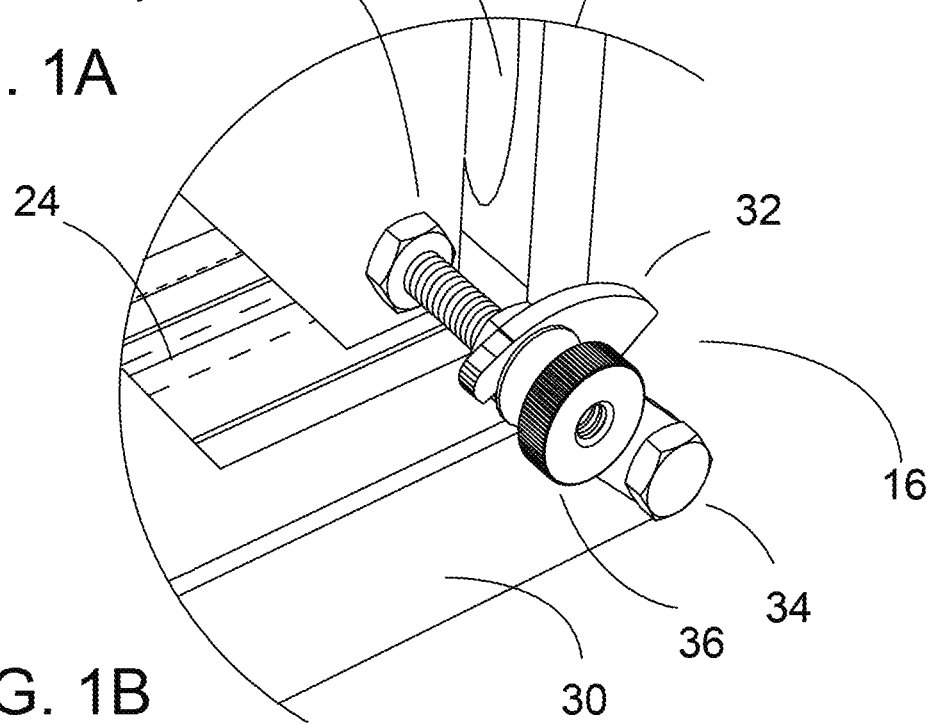
FIG. 1B is an enlarged view of the positioning bolt in contact with the workpiece being drilled.

Referring to FIG. 1A a woodworking machinery jig and fixture system is disclosed incorporating a pocket hole jig 10 and a side mounted flip stop arm 16 and a decal/indicia 24 mounted on the floor 26 of the jig 10. The flip arm assembly 16 is secured to side 30 of the pocket hole jig 10. The workpiece 14 is positioned against the stop bolt 33 for consistent measuring of the multiple work pieces. As illustrated in FIG. 1B the bolt 33 is held in place by a flip arm 32 which is bolted to the side 30 of the jig 10 with another bolt 34. A workpiece board 14 is positioned on the jig 10 for drilling in the jig 10 and is in contact with an adjustable positioning bolt 34 in the flip stop assembly 16.

Referring to FIG. 2A and FIG. 2B the flip stop 32 is L-shaped with a hole 40 on the end of the long leg with a slot 44 on the opposite end with a V-notch 42 in the middle. FIG. 2C is an exploded view of the flip arm assembly 16 showing the adjustable bolt 33, the adjustable position nut 46, the L-shaped flip arm 32 and the tightening thumb nut 36. FIG. 2D shows a rotated view of FIG. 2C showing the adjustment bolt 33 fitting into the notch 44 in the flip stop arm 32.

FIGS. 3A, 3B and 3C illustrate the jig 10 with a flip stop assembly 16 on both sides. The nearer one is in the active position 80 and the flip stop assembly 16 on the opposite side of the jig 10 is in the standby position 82 in which it is not touching the work piece 14.

Figure 4A:
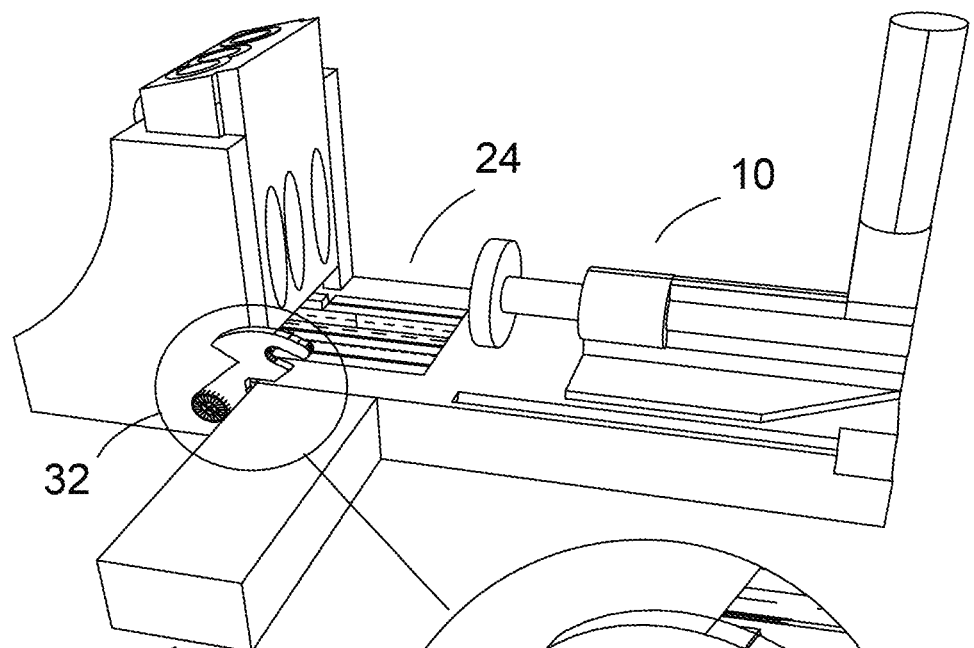
FIG. 4A shows the jig with a workpiece support board clamped on a table next to the jig. A V-shaped notch in the flip arm allows the flip arm to rest in alignment with the workpiece and not contact the support board.
Figure 4B:
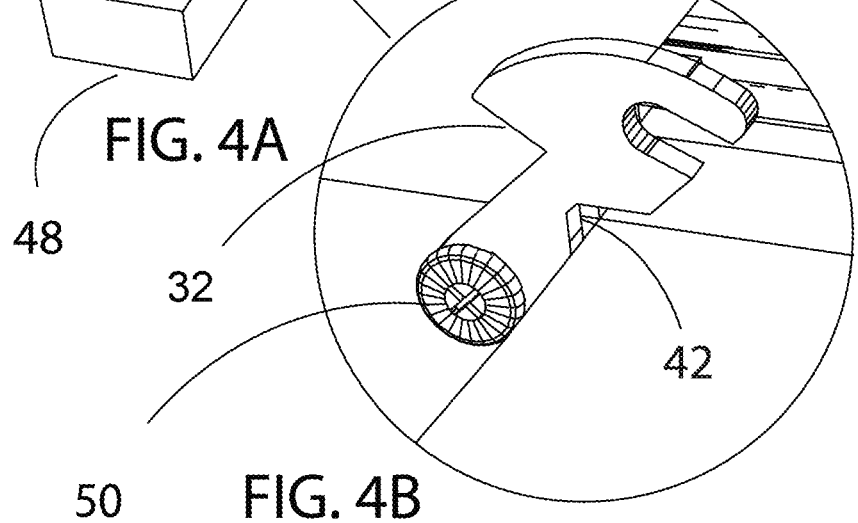
FIG. 4B is a perspective view showing the flip arm resting over the support board with a close-up view of the V-notch in the middle of the outside leg of the L-shaped flip arm.
Figure 4C:
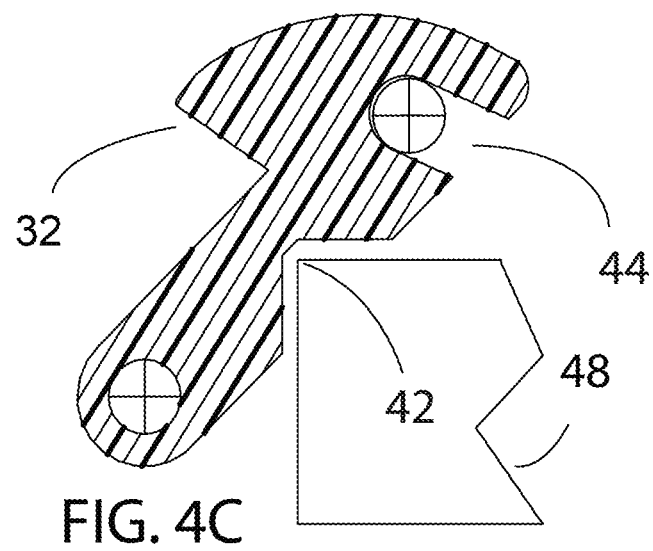
FIG. 4C is an end view of the support board corner fitting into the flip stop arm V-notch.

FIG. 4A shows the jig 10 with a support board 48 for supporting a work piece or panel. It shows the flip arm 32 mounted to the side of the jig 10 with the arm positioned over the support board 48. A V-shaped notch 42 in the flip arm 32 allows the flip arm 32 to rest in alignment with the workpiece and not contact the support board. FIG. 4C is an end section view of the support board 48 corner fitting into the flip stop arm V-notch 42.

FIG. 5A is a ground level perspective showing the pocket hole jig 10 with a flip stop assembly 16 attached on the side of the jig 10. FIG. 5B illustrates the floor sides and the interior support ribs 52 of the plastic pocket hole jig 10. FIG. 5C shows the flip arm 32 secured to the solid wall of the jig with a nut 46 and a bolt 34 positioned in a hole in the jig wall 52. FIG. 5D is an exploded view of FIG. 5C.

Figure 6A:
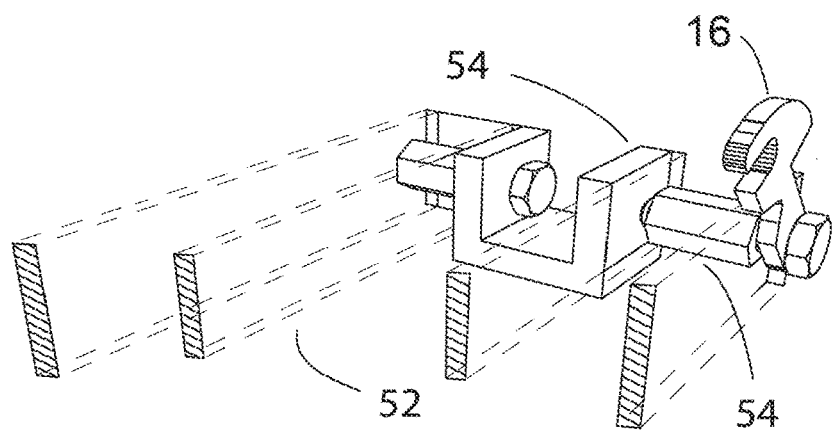
FIG. 6A shows the securing bolt engaging a coupler nut inside the jig which also is secured to a U-shaped extrusion on the opposite end of the couple nut. A couple nut is also bolted to the opposite leg of the U-shaped extrusion. An interior rib of the jig is locked between the U-extrusion and the coupler nut.
Figure 6B:
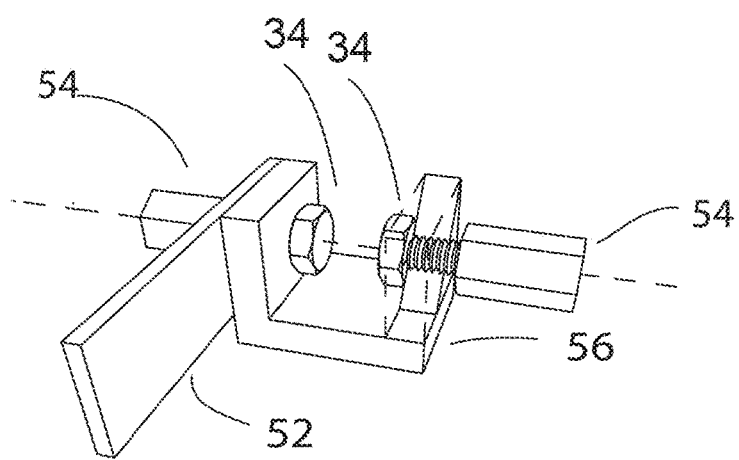
FIG. 6B is a perspective view of the U-extrusion with a cut away view of half of the extrusion side leg showing the bolt threads.
Figure 6C:
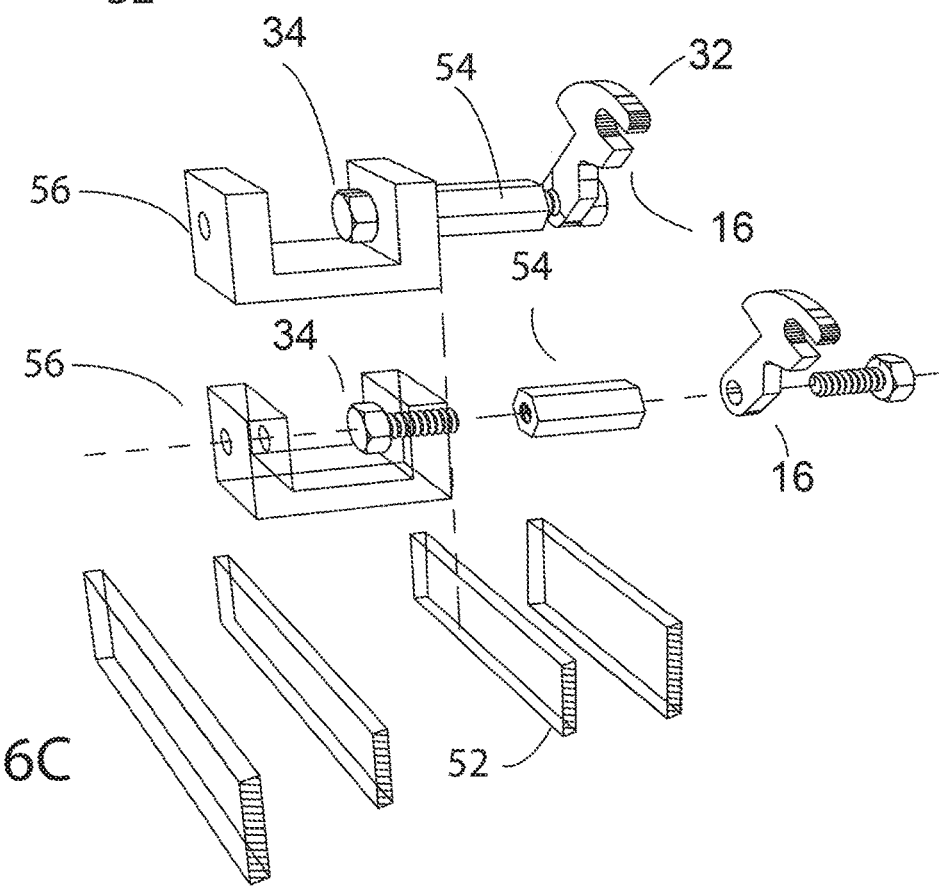
FIG. 6C is an exploded view of the U-extrusion, the couple nut, flip arm and bolt.

FIGS. 6A, 6B and 6C show the securing bolt 34 engaging a coupler nut 54 inside the jig 10 which also is secured to a U-shaped extrusion 56 on the opposite end of the coupler nut 54. A coupler nut 54 is also bolted to the opposite leg of the U-shaped extrusion 56. An interior rib 52 of the jig 10 is locked between the U-shaped extrusion 56 and the coupler nut 54. FIG. 6B is a perspective view of the U-shaped extrusion 56 with a cut away view of half of the extrusion side leg showing the bolt threads.

Figure 7B:
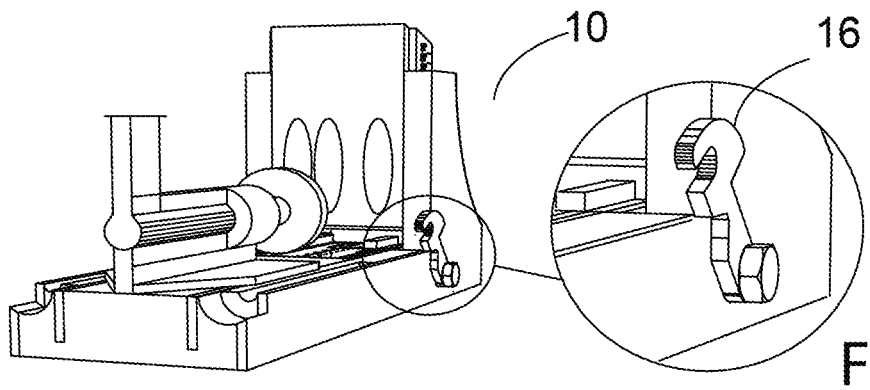
FIG. 7B is an exploded view of the inside of the jig with a wider U-shaped extrusion and the flip stop assembly with the parts aligned with each other.
Figure 7A:
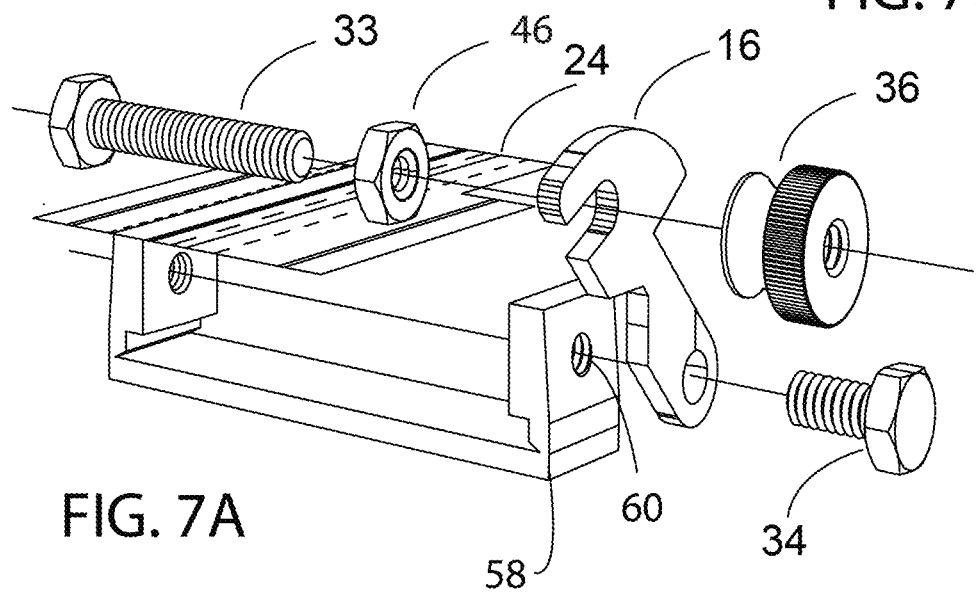
FIG. 7A is an exploded view of the inside of the jig with a wider U-shaped extrusion that is the width of the double coupler and U-shaped unit described in FIGS. 6A, 6B and 6C. The bolt secures the flip arm by engaging a threaded hole in the side wall of the custom designed U-shaped extrusion. The view is expanded but the parts are in line with each other.
Figure 7C:
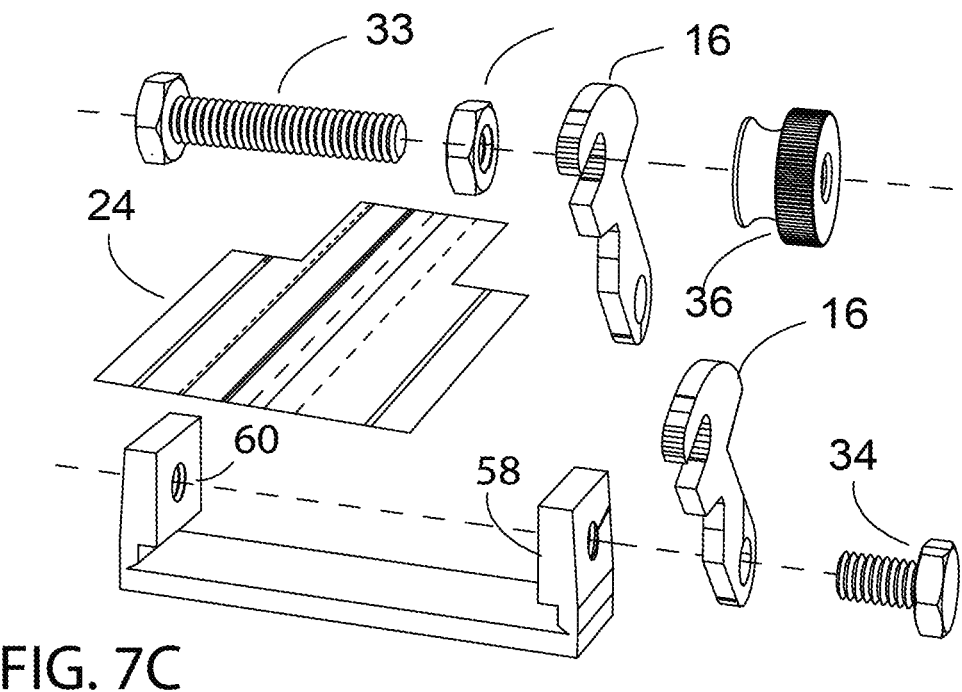
FIG. 7C is an exploded view of FIG. 7B.

FIG. 7A is an exploded view of the inside of the jig with a wider U-shaped extrusion 58 that is the width of the double coupler and U-shaped unit described in FIGS. 6A, 6B and 6C. The bolt 34 secures the flip arm 32 by engaging a threaded hole 60 in the side wall of the custom designed U-shaped extrusion 58. The view is expanded but the parts are in line with each other. FIG. 7B is an isometric view of the inside of the jig with a wider U-shaped extrusion 58 and the flip stop assembly 16 with the parts aligned with each other. FIG. 7C is an exploded view of FIG. 7B with an additional flip arm 32 to illustrate coupling to the U-shaped extrusion 58.

Figure 8:
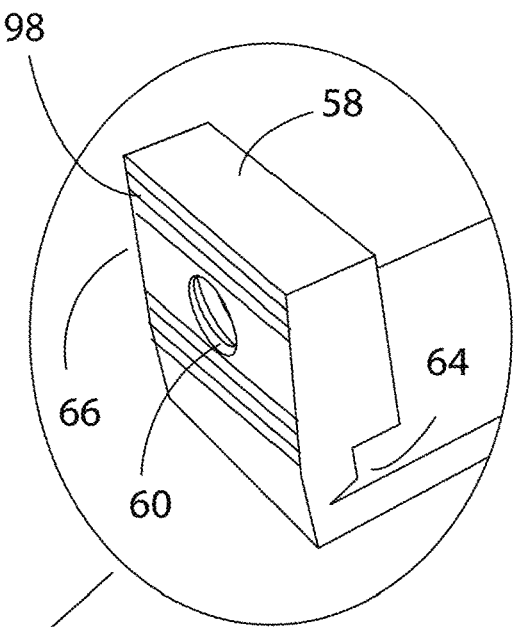
FIG. 8A is a perspective of the custom made U-shaped extrusion illustrating the threaded hole near the side of the side wall.
FIG. 8B illustrates the angle of the outside of the U-shaped extrusion wall to fit the angle of the inside of the jig, such as the injection molded KREG jig.
FIG. 8C is the same perspective as FIG. 8B and illustrates small grooves above and below the threaded hole for the option of gluing the extrusion in place inside the jig.
FIG. 8D illustrates a notch in the inside corner of the extrusion which allows the side walls to be angled slightly for a snug fit inside the jig.
FIG. 8E is a close up view of the notch.
Figure 8:
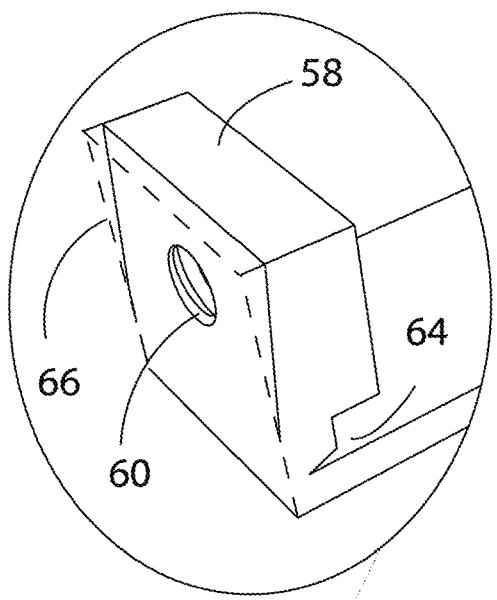
Figure 8:
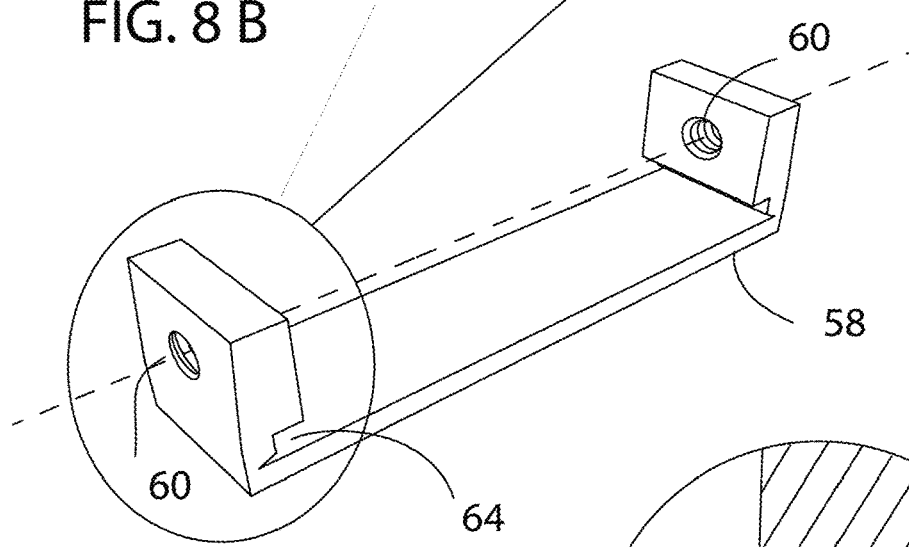
Figure 8:
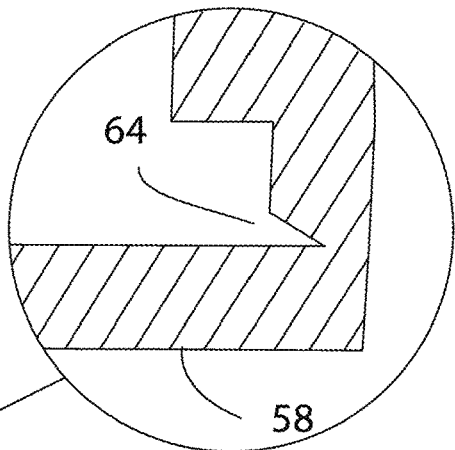
Figure 8:
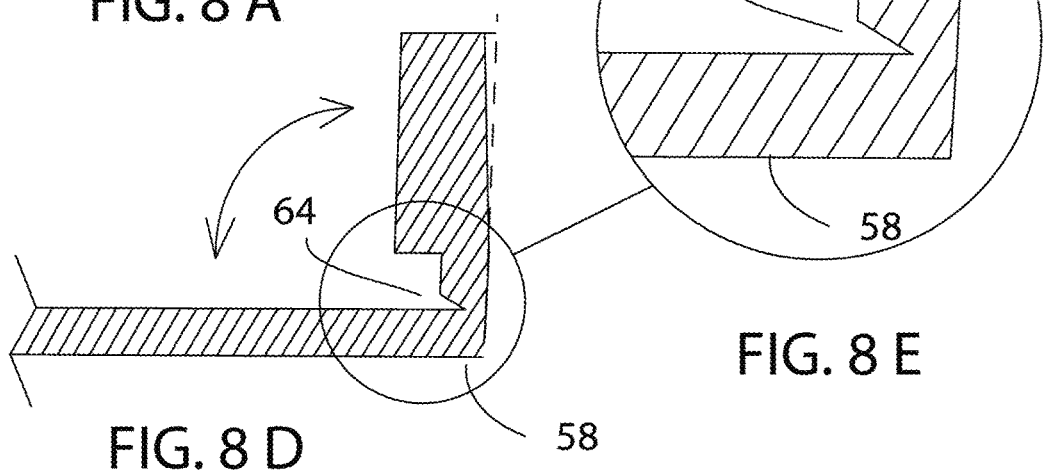

FIG. 8A is a perspective of the custom made U-shaped extrusion 58 illustrating the threaded hole 60 near the side of the side wall and a notch 64 located on the inside corner of the extrusion 58. FIG. 8B illustrates the angle of the outside of the U-shaped extrusion wall 66 designed to fit the angle of the inside of the injection molded jig 10. FIG. 8C is the same perspective as FIG. 8B and illustrates small grooves 98 above and below the threaded hole 60 for the option of gluing the extrusion 58 in place inside the jig 10. FIG. 8D illustrates a notch 64 in the inside corner of the extrusion 58 which allows the side walls 66 to be angled slightly for a snug fit inside the jig. FIG. 8E is a close-up view of the notch 64.

FIG. 9A is a perspective of the flip arm assembly 16 secured on the long bolt 34 attached to the side of the jig 10. FIG. 9B is a close up of the flip stop assembly 16 illustrating the nut 46 locking the bolt 34 to the jig 10 and showing the detail of the V-notch 42 in the middle of the flip arm 32 not contacting the support workpiece support board. FIG. 9C is a close-up view of the flip stop arm 32. FIG. 9D illustrates the flip arm assembly 16 positioned on a threaded bolt 34 positioned away from the jig 10 and the flip stop arm 32 is in contact with the tip of a mitered board 68. FIG. 9E is a detail of the miter point pf the mitered board 68 in contact with flip arm 32.

FIG. 10A shows the drill guide block 12 sliding into the portable base 70. FIG. 10B is an expanded view of the portable base 70, the decal/indicia 24, and the flip arm 32 and the custom extrusion 72. FIG. 10C is a perspective cut away view of the portable base 70 and the screws 50 that fit through the holes inside the base and thread into the holes 60 on the top of the custom made extrusion 72. FIG. 10D is an end view of the portable custom designed extrusion 72 showing a T-slot 97, hole 40 and a U-channel 71. FIG. 10E is a sectional view of the custom extrusion 72 illustrated in FIG. 10D showing how the flip stop assembly 16 is connected to the jig 10 with a threaded bolt 34.

FIG. 11A is a perspective showing the angle of a miter joint resting on the portable base 70 floor with the tip of the mitered board 68 contacting the flip stop arm 32 secured to the jig 10 with a long bolt 34. FIG. 11B is a close-up view of the FIG. 11A illustrating the decal/indicia 24 viewable from the front of the portable base 70 floor. FIG. 11C illustrates the tip of the mitered board 68 in contact with the flip arm 32. The functional visibility of the decal/indicia 24 on at least one surface or from at least one vantage allows a user to precisely position a workpiece in relation to the various openings in the jig 10, even when the openings on the vertical face of the jig 10 are obscured, in whole or in part, by the workpiece.

FIG. 12A illustrates a version of the flip assembly with the material support arm 84 secured to the jig with a bolt 34. FIG. 12B illustrates the slot 44 added to the in the flip arm 84 to easily remove and reposition the adjustment bolt assembly. FIG. 12C is an enlarged view of FIG. 12A. FIG. 12D illustrates a V-notch 99 made in the middle of the flip arm 84, such as the KREG flip arm. FIG. 12E is a perspective view of the V-notch 99 added to the flip arm 84.

FIG. 13A illustrates a modified material support arm 84, such as the KREG arm, that was drilled and taped at 90 degrees from the through hole used to attach the arm 84 (shown in FIG. 12A). It is threaded on to a bolt 34 fitted to the jig 10 and secured with a nut 46. FIG. 13B is a close-up view of FIG. 13A. FIG. 13C illustrates FIG. 13A with a mitered board 68 contacting the support arm 84. FIG. 13D is a close up of FIG. 13C showing the miter point against the support arm stop 84. FIG. 13E illustrates a workpiece resting on the material support base 86, such as the KREG material support base, with the thin metal flip arm 32 of the invention elevated to engage the end of the board to record the desired position of the workpieces. The base on the left has the flip stop arm 32 in the active position 80 while the flip stop arm 32 on the right is below the workpiece in the stand by position 82.

FIG. 14A is a perspective of the jig 10 with the drill guide block 12 removed to show the decal/indicia 24 of the invention, which in one form is a piece of screen-printed thin aluminum sheet stock die cut in a T-shape 76 with the shape of two rectangles connected to each other. FIG. 14B is a close up of the decal/indicia 24. The decal/indicia 24 can also be printed on an adhesive backed label, laser etched and painted, and the like. FIG. 14C is a close-up view of the decal/indicia 24 fitted between the two elevated ribs 78 on the floor of the jig 10.

Figure 15:
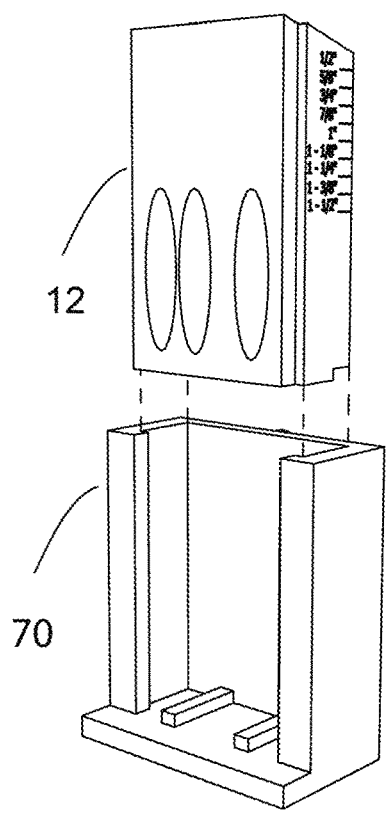
FIG. 15A shows how the body of the drill guide block fits into the portable base.
FIG. 15B is an exploded view of the decal/indicia and the portable base. It shows that the decal/indicia is bent at 90 degrees so that it also covers the front floor of the portable base.
FIG. 15C shows the decal/indicia positioned between the elevated ribs at the bottom of the example injection molded portable base floor.
FIG. 15D is a close-up view of FIG. 15C.
FIG. 15E is a close up of FIG. 15C showing just the dotted lines.
Figure 15:
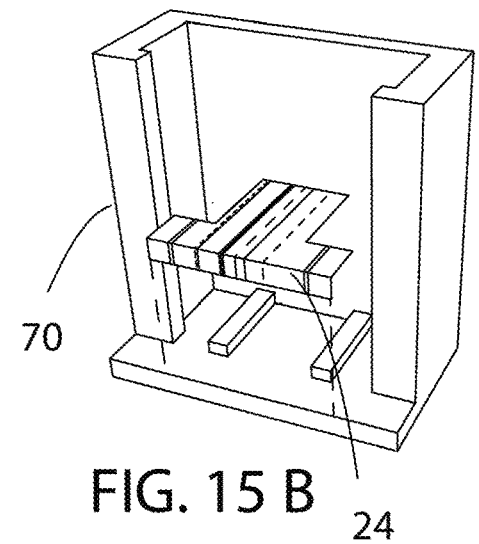
Figure 15:
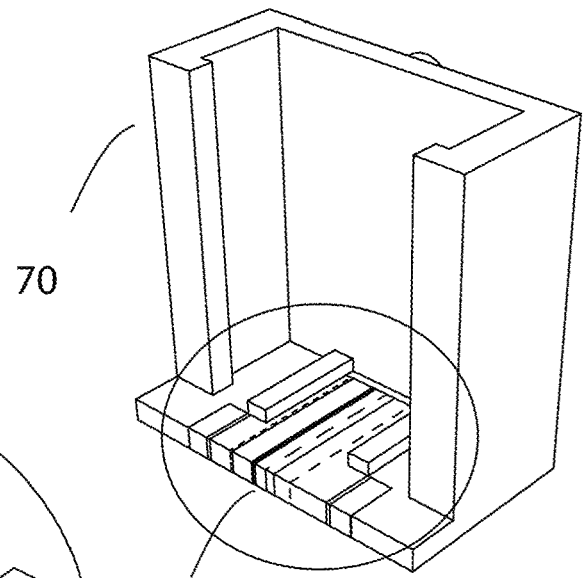
Figure 15:
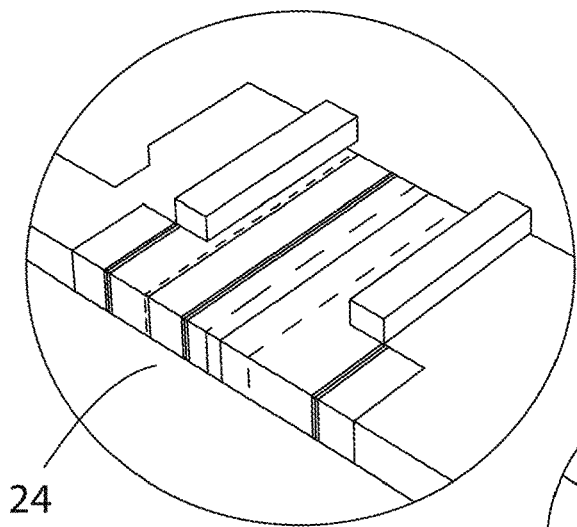
Figure 15:
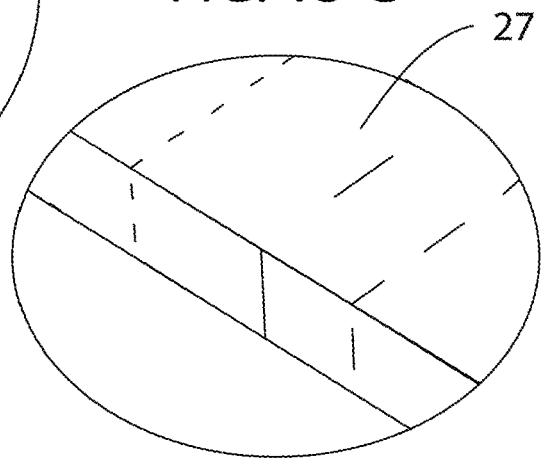

FIG. 15A shows how the body of the drill guide block 12 fits into the portable base 70. FIG. 15B is an exploded view of the decal/indicia 24 and the portable base 70. It shows that the decal/indicia is bent at 90 degrees so that it also covers the front floor of the portable base 70. FIG. 15C shows the decal/indicia 24 positioned between the elevated ribs at the bottom of the injection molded portable base 70 floor. FIG. 15D is a close-up view of FIG. 15C illustrating how the 90 degree bend in the decal/indicia 24 allows it to be viewed from the front of the jig 10. FIG. 15E is a close up of FIG. 15C showing just the dotted center lines of the pocket hole combinations 27.

Figure 16:
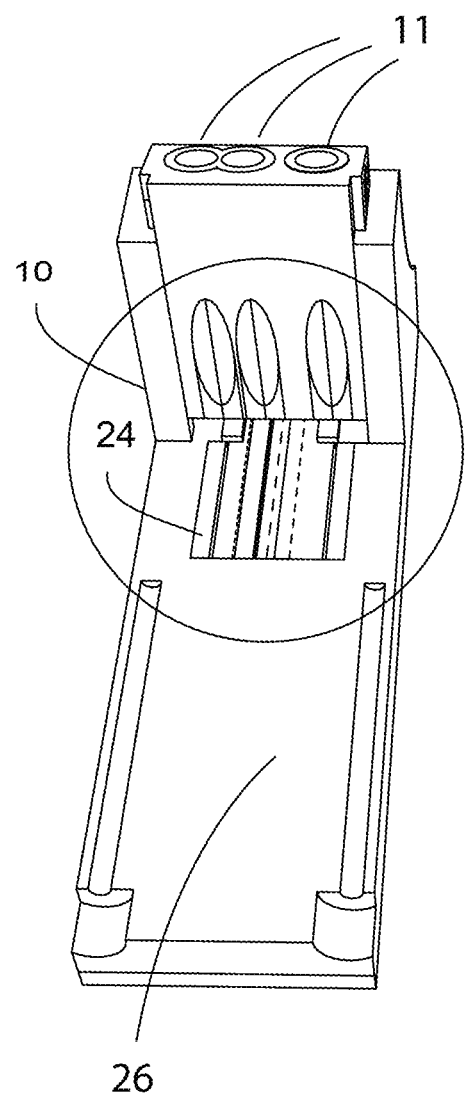
FIG. 16A is a view of the pocket hole jig with the clamp removed for easy viewing of the decal/indicia on the front of the jig.
FIG. 16B is an enlargement of FIG. 16A showing the relationship between the three pocket hole guide bushings and the decal/indicia. The wide blue line represent the middle of the drill guide holes.
Figure 16:
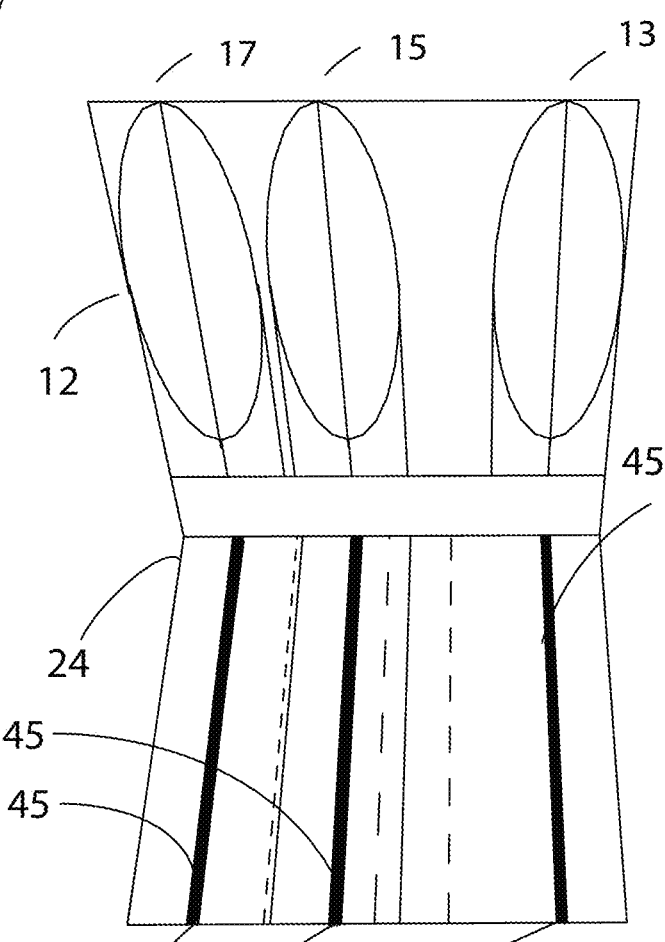

FIG. 16A is a view of the pocket hole jig 10 with the clamp removed for easy viewing of the decal/indicia 24 on the front of the jig 10. FIG. 16B is an enlargement of FIG. 16A showing the relationship between the three pocket hole guide bushings A 13, B 15 and C 17 and the decal/indicia 24. The wide blue line 45 represent the middle of the drill guide holes.

FIG. 17A is a smaller version of FIG. 16B sized so that it can be illustrated on a page with the other sectors of information shown next to each other. It shows the combination of all three holes 91. FIG. 17B illustrates 92 which the smaller B 15 and C 17 hole combination. FIG. 17C illustrates 93 which is the medium size 15 an 13 and hole combination. FIG. 17D illustrates 94 which is the widest 17 and 13 hole combination. FIGS. 17E, F, G and H illustrate the pocket hole center line combinations. FIGS. 17I, J, K and L illustrate the pocket hole center line combinations 9. Looking at FIGS. 17D and 17H, the wide blue lines represent the respective centers of the aligned holes 17 and 13. Then, as shown in FIG. 17L, the dashed line represents the center line between the holes 17 and 13. Turning to FIGS. 17C and 17G, the wide blue lines represent the respective centers of the aligned holes 15 and 13. Then, as shown in FIG. 17K, the dashed line represents the center line between the holes 15 and 13. Turning to FIGS. 17B and 17F, the wide blue lines represent the respective centers of the aligned holes 17 and 15. Then, as shown in FIG. 17J, the dashed line represents the center line between the holes 17 and 15. Finally, all of the wide blue lines are illustrated on FIG. 17E representing the respective centers of aligned holes 17, 15 and 13. And FIG. 17I includes the dashed line representations of the respective centers between paired combinations of the holes 17, 15 and 13. The functionality provided by the decal/indicia 24 properly engaged with and aligned to the plurality of drill guide passageways allows for precise, quick, repeatable and convenient positioning of a workpiece on the jig 10 to form the desired arrangement of holes in the workpiece.

Figure 18:
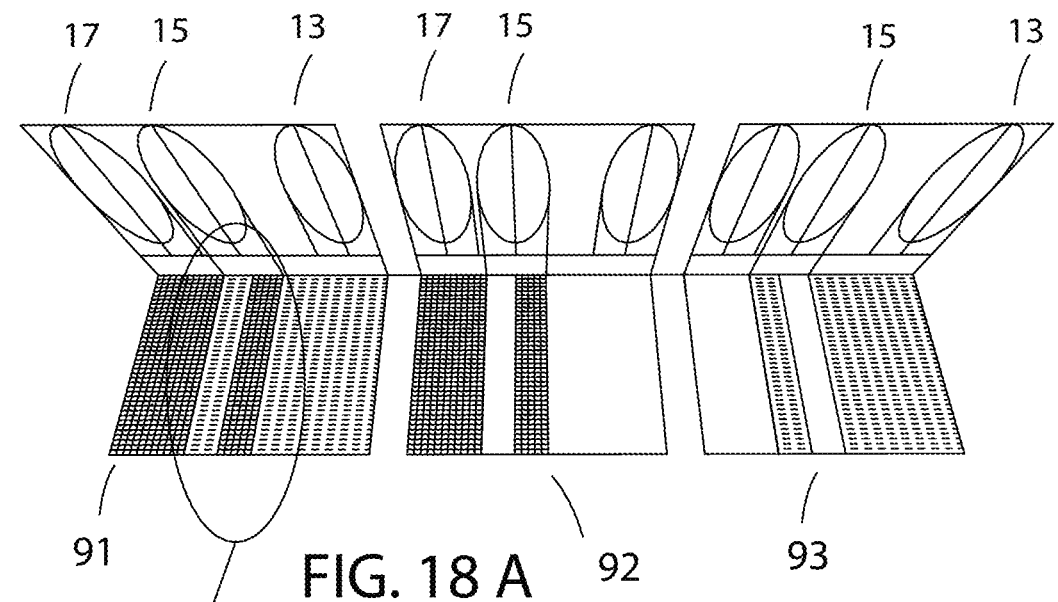
FIG. 18A illustrates the relationship of the pocket hole combinations using the symbols for yellow and silver. 91 is the pocket hole combination of holes ABC. 92 is the pocket hole combination of holes BC. 93 is the pocket hole combination of holes AB.
FIG. 18B is an enlarged version of FIG. 18A illustrating the overlap of combinations 92 and 93.
FIG. 18C illustrates the combination of lines and colored symbols.
Figure 18:
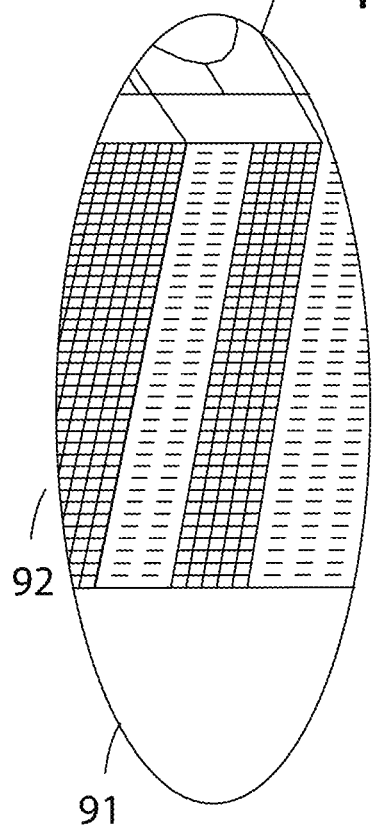
Figure 18:
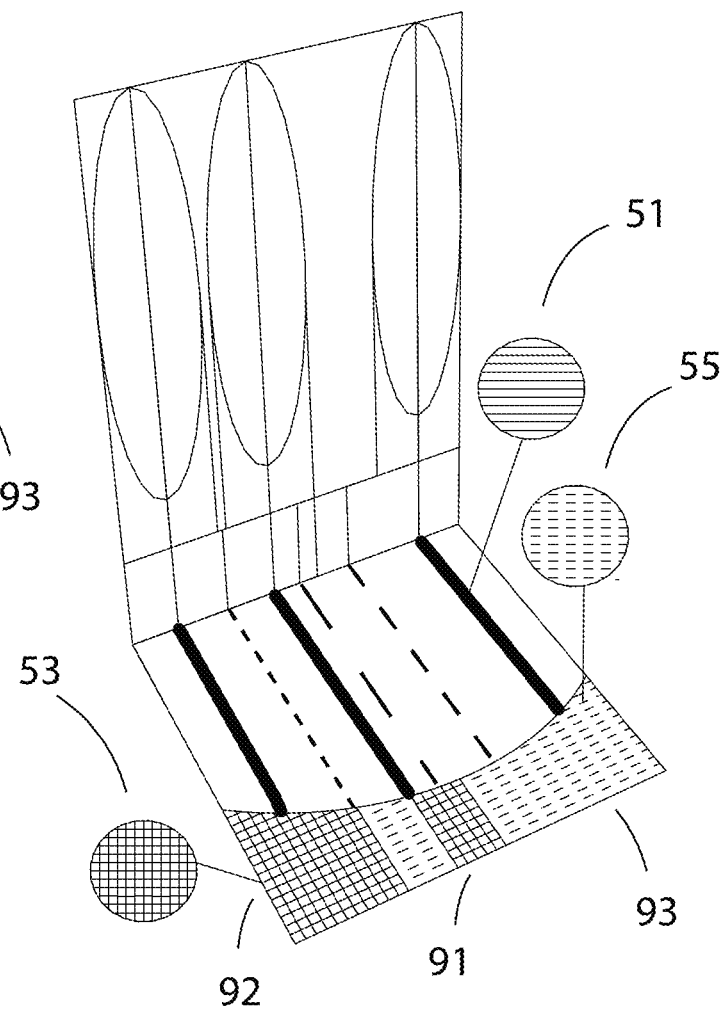

FIG. 18A illustrates the relationship of the pocket hole combinations using the symbols for yellow and silver. 91 is the pocket hole combination of holes 17, 15 and 13. 92 is the pocket hole combination of holes 17 and 15. 93 is the pocket hole combination of holes 15 and 13. FIG. 18B is an enlarged version of FIG. 18A illustrating the overlap of combinations 92 and 93. FIG. 18C illustrates the combination of lines and colored symbols.

FIG. 19A shows the workpiece 14 clamped in the pocket hole jig 10 with the center line 85 of the workpiece 14 aligned with the dotted center line of hole combinations 92 of the decal/indicia 24 shown in FIG. 17J. FIG. 19B is an enlargement of FIG. 19A. FIG. 19C shows the workpiece 14 centered on the yellow area of the decal/indicia 53. FIG. 19D is an enlargement of FIG. 19C. The decal/indicia 24 can be configured to include color coding and line markings, such that the functional relationships both between the workpiece and the respective indicia can be discerned and between the color coding and line markings.

Preferred embodiments of the invention have been described in considerable detail. Many modifications and variations to the preferred embodiments described will be apparent to a person of ordinary skill in the art. Therefore, the invention should not be limited to the embodiments described.

I claim:

1. A flip stop assembly capable of use with jig and fixture systems, the flip stop assembly comprising:
a flip member extending from a proximal end to a distal end, the proximal end being configured for rotational engagement about an axis;
wherein a notch and a slot are defined in the flip member between the proximal end and the distal end; and
wherein the notch and the slot open in a first direction.

2. The flip stop assembly of claim 1, wherein the notch is approximately 90 degrees.

3. The flip stop assembly of claim 1, wherein the notch is positioned midway between the proximal end and the distal end.

4. The flip stop assembly of claim 1, wherein the slot in the flip member is near the distal end.

5. The flip stop assembly of claim 4, further comprising a positioning member releasably engaged with the slot and extending away from the distal end of the flip member, wherein the positioning member is configured to be adjustable in a direction of the axis.

6. The flip stop assembly of claim 5, further comprising:
an adjustment member engaged with the positioning member on a first side of the flip member to adjust a distance the positioning member extends away from the first side of the flip member; and
a lock member engaged with the positioning member on a second side of the flip member to selectively fix the distance the positioning member extends away from the first side of the flip member.

7. The flip stop assembly of claim 6, wherein:
the positioning member comprises a threaded rod positioned to extend laterally through the flip member near the distal end;
the adjustment member comprises a first threaded member engaged with the threaded rod and positioned to abut the first side of the flip member; and
the lock member comprises a second threaded member engaged with the threaded rod and positioned to abut the second side of the flip member that is opposite the first side;
wherein the positioning member is secured to the flip member when the first threaded member and the second threaded member are engaged with the respective first side and second side of the flip member.

8. The flip stop assembly of claim 7, wherein:
the threaded rod comprises a bolt;
the first threaded member is a nut; and
the second threaded member is a thumb nut.

9. A flip stop capable of use with jig and fixture systems, the flip stop comprising:
a body extending from a first end to a second end;
a hole proximate the first end and configured to establish rotational mounting of the flip stop;
a slot proximate the second end; and
a notch positioned between the first end and the second end;
wherein the slot opens in a first direction; and
wherein the notch opens in the first direction.

10. The flip stop of claim 9, wherein the notch defines a generally V-shape.

11. The flip stop of claim 9, wherein opposing walls defining the notch are oriented at approximately ninety degrees.

12. The flip stop of claim 11, wherein a base of the notch is skewed relative to the opposing walls.

13. The flip stop of claim 12, wherein the base defines a wall that is coplanar with an imaginary plane intersecting a first central axis of the hole and a second central axis of the slot.

14. The flip stop of claim 9, wherein the second end defines an arcuate head.

15. A flip stop assembly capable of use with jig and fixture systems having a base portion and a guide portion, the flip stop assembly comprising:
a flip stop body extending from a first end to a second end, the flip stop body defining:
an opening proximate the first end;
a slot proximate the second end that opens in a first direction; and
a notch between the first end and the second end that opens in the first direction; and
a positioning member configured to selectively engage the slot and extend laterally from the flip stop body.

16. The flip stop assembly of claim 15, wherein the flip stop assembly is pivotable about an axis of the opening between an active position, at which the second end of the flip stop body intersects a working area defined by the base portion and the guide portion, and a standby position, at which the second end of the flip stop body does not intersect the working area.

17. The flip stop assembly of claim 15, wherein the notch is positioned intermediate the first end and the second end.

18. The flip stop assembly of claim 15, wherein the opening is configured to be rotatably coupled to one of the base portion and the guide portion.

19. A flip stop capable of use with jig and fixture systems, the flip stop comprising:
a body extending from a first end to a second end;
a hole proximate the first end and configured to establish rotational mounting of the flip stop;
a slot proximate the second end; and
a notch positioned between the first end and the second end;
wherein opposing walls defining the notch are oriented at approximately ninety degrees;
wherein a base of the notch is skewed relative to the opposing walls; and
wherein the base defines a wall that is coplanar with an imaginary plane intersecting a first central axis of the hole and a second central axis of the slot.

20. The flip stop of claim 19, wherein:
the slot opens in a first direction; and
the notch opens in the first direction.

* * * * *